United States Patent
Chen et al.

(10) Patent No.: US 12,238,692 B2
(45) Date of Patent: Feb. 25, 2025

(54) INFORMATION SENDING AND DETECTING METHOD AND DEVICE

(71) Applicant: ZTE Corporation, Shenzhen (CN)

(72) Inventors: Yijian Chen, Shenzhen (CN); Zhaohua Lu, Shenzhen (CN); Yu Ngok Li, Shenzhen (CN); Hao Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 172 days.

(21) Appl. No.: 17/967,178

(22) Filed: Oct. 17, 2022

(65) Prior Publication Data

US 2023/0112599 A1    Apr. 13, 2023

Related U.S. Application Data

(63) Continuation of application No. 16/323,730, filed as application No. PCT/CN2017/095847 on Aug. 3, 2017, now Pat. No. 11,497,014.

(30) Foreign Application Priority Data

Aug. 12, 2016    (CN) .......................... 201610666552.5

(51) Int. Cl.
*H04J 3/00*     (2006.01)
*H04W 24/08*     (2009.01)
(Continued)

(52) U.S. Cl.
CPC ....... *H04W 72/0446* (2013.01); *H04W 24/08* (2013.01); *H04W 72/23* (2023.01)

(58) Field of Classification Search
CPC . H04W 72/0446; H04W 24/08; H04W 72/23; H04W 24/10; H04W 48/12; H04L 5/0048; H04L 5/0053
See application file for complete search history.

(56) References Cited

U.S. PATENT DOCUMENTS 10,524,241 B2 *  12/2019  Cheng ................... H04W 72/23
2013/0294366 A1  11/2013  Papasakellariou
(Continued)

FOREIGN PATENT DOCUMENTS

CN    101860970 A    10/2010
CN    102123432 A    7/2011
(Continued)

OTHER PUBLICATIONS

Huawei, "Control Region Signalling and Search Space for R-PDCCH", 3GPP TSG RAN WG1 meeting #59, Jeju, Korea, Nov. 9-13, 2009, R1-094721.
(Continued)

*Primary Examiner* — Thai Dinh Hoang
(74) *Attorney, Agent, or Firm* — CANTOR COLBURN LLP

(57) ABSTRACT

Provided is an information sending method, including: a base station determining a transmission configuration parameter associated with a first control region, where the first control region is used for transmitting a common control message; and determining first indication information according to the transmission configuration parameter, and sending the first indication information at a preset position of a second control area. A time domain symbol set corresponding to the second control area is a subset of a time domain symbol set corresponding to the first control area. Further provided is an information detection method, including: receiving first indication information used for indicating a transmission configuration parameter of a first control area, and detecting the common control information according to the first indication information. Further provided are an information sending device and an information detecting device.

15 Claims, 18 Drawing Sheets

(51) Int. Cl.
*H04W 72/0446* (2023.01)
*H04W 72/23* (2023.01)

(56) References Cited

U.S. PATENT DOCUMENTS

| | | |
|---|---|---|
| 2014/0036810 A1 | 2/2014 | Harrison |
| 2014/0301238 A1 | 10/2014 | Chun |
| 2014/0335881 A1* | 11/2014 | Rubin .................. H04W 72/51 455/452.1 |
| 2014/0376378 A1* | 12/2014 | Rubin ............... H04W 28/0215 370/235 |
| 2015/0036652 A1 | 2/2015 | Lee |
| 2015/0078272 A1 | 3/2015 | Kim |
| 2015/0078284 A1 | 3/2015 | Lee |
| 2015/0079945 A1* | 3/2015 | Rubin ................ H04W 28/021 455/411 |
| 2015/0085788 A1 | 3/2015 | Kim |
| 2015/0181568 A1 | 6/2015 | Seo |
| 2015/0244508 A1 | 8/2015 | Kim |
| 2015/0245346 A1* | 8/2015 | Yokomakura ......... H04W 72/23 370/329 |
| 2015/0249974 A1 | 9/2015 | Lee |
| 2015/0264667 A1 | 9/2015 | Lee |
| 2015/0305025 A1* | 10/2015 | Moraru ............ H04W 72/0446 370/294 |
| 2015/0305059 A1 | 10/2015 | Li |
| 2016/0143044 A1 | 5/2016 | Suzuki |
| 2016/0183276 A1 | 6/2016 | Marinier |
| 2021/0136827 A1* | 5/2021 | Xiong ................ H04W 74/004 |
| 2022/0116999 A1* | 4/2022 | Xiong ............... H04W 74/0836 |
| 2023/0217504 A1* | 7/2023 | Xiong ............... H04W 74/0891 370/329 |

FOREIGN PATENT DOCUMENTS

| | | |
|---|---|---|
| CN | 102724757 A | 10/2012 |
| CN | 103404046 A | 11/2013 |

OTHER PUBLICATIONS

International Search Report for corresponding application PCT/CN2017/095847 filed Aug. 3, 2017; Mail date Oct. 27, 2017.
Written Opinion for corresponding application PCT/CN2017/095847 filed Aug. 3, 2017; Mail date Oct. 27, 2017.

* cited by examiner

INFORMATION SENDING AND DETECTING METHOD AND DEVICE

CROSS-REFERENCES TO RELATED APPLICATIONS

The present application is a continuation application of U.S. patent application Ser. No. 16/323,730, filed on Apr. 29, 2019, which is a U.S. National Stage Application, filed under 35 U.S.C. 371, of International Patent Application No. PCT/CN2017/095847, filed on Aug. 3, 2017, which claims priority to Chinese patent application No. 201610666552.5 filed on Aug. 12, 2016, contents of all of which are incorporated herein by reference in their entireties.

TECHNICAL FIELD

The present disclosure relates to a field of information processing technology and, in particular, to an information sending method and device, and an information detecting method and device.

BACKGROUND

In a radio communication system, a downlink physical layer control channel plays a very important role. Functions of control information of the physical layer include: (1) sending a downlink assignment (DL Assignment) to UE such that the UE receives information at a downlink data channel; here, the data channel may carry some higher layer signaling messages in addition to carrying data; (2) sending uplink grant (UL Grant) to the UE such that the UE sends information on an uplink data channel (3) sending an aperiodic channel quality indicator (CQI) report request; (4) notifying change of a main control channel (MCCH); (5) sending an uplink power control command; (6) relevant information on hybrid automatic repeat quest (HARQ); (7) carrying a radio network temporary identifier (RNTI), the information is implicitly included in the cyclic redundancy check (CRC).

Information carried by a physical downlink control channel (PDCCH) is called downlink control information (DCI). When indicating cell-level information, the DCI is usually scrambled by using system information (SI)-RNTI/P (paging)-RNTI/random access (RA)-RNTI, or using other types of information such as TPC-PUCCH-RNTI, G-RNTI and SC-RNTI for scrambling. When indicating UE level information, the DCI is usually scrambled by using information such as C-RNTI/SPS C-RNTI/Temporary C-RNTI. Different RNTI scrambling means that the message faces different user groups and plays different roles. If the RNTI information used in the scrambling cannot be learned, the content of these control messages cannot be accurately acquired.

Generally speaking, the classification of the control channel and its corresponding search space is shown in table one.

TABLE 1

| Classification of control channel and search space | |
|---|---|
| Control channel/ Search space type | Common sending content and scrambling manners |
| Common control channel/ Common search space | System message (SI-RNTI); paging message (P-RNTI); Random access configuration message/ RA-RNTI; PUCCH power control signaling message TPC-PUCCH-RNTI |

TABLE 1-continued

| Classification of control channel and search space | |
|---|---|
| Dedicated control channel/ Dedicated search space | User dedicated uplink and downlink licensed signaling C-RNTI/SPS C-RNTI/ Temporary C-RNTI |

In the existing art, a sending scheme of the common control channel works in high frequency and is based on beams, and the sending scheme includes: sending by polling predetermined multiple narrow beams, and each beam may correspond two ports to perform the diversity coding transmission. A sending scheme of the dedicated control channel works in high frequency and is based on beams, and the sending scheme: sending with one predetermined narrow beam, and each beam may correspond two ports to perform the diversity coding transmission. However, the existing transmission scheme of the control channel based on beams and high frequency has the disadvantage of low resource utilization. Specifically: the transmission of the common control information needs a large number of beams, the high frequency transmission generally adopts radio frequency beams, but the radio frequency beams need to be weighted in the time domain, which affect the whole frequency domain. Therefore, at the same time domain symbol, a same physical transmitting antenna channel has only one radio frequency beam. In this case, the frequency domain bandwidth of the high frequency is large, some types of the transmitted common control information only has a small number of information bits. For example, the common control information carried by a 1 GHz bandwidth is only 60 bits, resulting in serious resource waste. On the other hand, since the beam has been pre-defined as a scanning beam within a cell range, the beam cannot be flexibly selected according to UE information when data information is sent, losing an effect of closed-loop transmission. In this case, the common control channel has problem that a large number of frequency domain resources cannot be utilized sufficiently.

SUMMARY

In view of this, embodiments of the present disclosure provide an information processing method, a terminal and a base station for effectively reducing the waste of the frequency domain resources and improving the resource utilization of control channels.

The technical solutions of the present disclosure are implemented as follows:

An embodiment of the present disclosure provides an information sending method. The method includes: determining, a transmission configuration parameter associated with a first control area, where the first control area is used for transmitting a common control message; and determining first indication information according to the transmission configuration parameter, where the first indication information is used for indicating a configuration of the transmission configuration parameter; sending the first indication information through a physical downlink broadcast channel or at a preset position of a second control area; where a time domain symbol set corresponding to the second control area is a subset of a time domain symbol set corresponding to the first control area.

In an embodiment of the present disclosure, the transmission configuration parameter associated with the first control area is determined. The first control area is used for transmitting the common control message. According to the transmission configuration parameter, the first indication information is determined. The first indication information is used for indicating the configuration of the transmission configuration parameter. The first indication information is sent through the physical downlink broadcast channel or at the preset position of the second control area. The time domain symbol set corresponding to the second control area is the subset of the time domain symbol set corresponding to the first control area.

In an embodiment of the present disclosure, the transmission configuration parameter includes any one or more of: indication information of a time domain resource or time domain resource pool of the first control area, indication information of a spatial domain resource or spatial domain resource pool of the first control area, an indication parameter of a frequency domain resource or frequency domain resource pool of the first control area, sending power configuration indication information of the first control area, pilot configuration indication information of the first control area, and channel structure indication information of the first control area.

In an embodiment of the present disclosure, the indication information of the time domain resource or time domain resource pool of the first control area includes: any one or more of a number of second time units occupied by the first control area in a first time unit, a number of orthogonal frequency division multiplexing (OFDM) symbols in a second time unit, and a sending period or a subframe offset of the first control area; where a time unit includes a preset number of second time units.

In an embodiment of the present disclosure, the indication information of the spatial domain resource or spatial domain resource pool of the first control area includes: any one or more of a beam number indication parameter, a beam index indication parameter, a transmission layer number indication parameter, a sending sector indication parameter.

In an embodiment of the present disclosure, the indication parameter of the frequency domain resource or frequency domain resource pool of the first control area at least includes: any one of an indication parameter of an occupied subcarrier group or an indication parameter of an occupied resource block group.

In an embodiment of the present disclosure, the sending power configuration indication information of the first control area includes: any one or more of a power offset of demodulation pilot/measurement pilot and the control information in the first control area, a power offset of demodulation pilot/measurement pilot and the control information in the second control area, and a power offset of the first control area and the second control area.

In an embodiment of the present disclosure, the pilot configuration indication information of the first control area at least includes any one of: reference demodulation pilot configuration indication information or measurement pilot configuration indication information of symbols in which the first control area is located.

In an embodiment of the present disclosure, the channel structure indication information of the first control area includes: mapping indication information of each channel or signal on the symbols in which the first control area is located.

An embodiment of the present disclosure provides an information detecting method. The method includes: receiving first indication information, and detecting the common control information according to the first indication information. The first indication information is used for indicating a transmission configuration parameter of a first control area, and the first control area is used for transmitting common control information.

In an embodiment of the present disclosure, the receiving the first indication information includes: receiving the first indication information on a physical downlink broadcast channel or in a second control area.

In an embodiment of the present disclosure, a time domain symbol set corresponding to the second control area is a subset of a time domain symbol set corresponding to the first control area.

In an embodiment of the present disclosure, receiving by the user equipment the first indication information includes: determining, by the user equipment, according to a type of control information, whether to detect the first indication information; and in response to determining to detect the first indication information, performing a sequence detection at a convention position in the second control area and acquiring the first indication information; or receiving the control information carrying the first indication information at a preset position in the second control area.

In an embodiment of the present disclosure, the transmission configuration parameter includes any one or more of indication information of a time domain resource or resource pool of the first control area, indication information of a spatial domain resource or resource pool of the first control area, an indication parameter of a frequency domain resource or resource pool of the first control area, sending power configuration indication information of the first control area, pilot configuration indication information of the first control area, and channel structure indication information of the first control area.

In an embodiment of the present disclosure, the indication information of the time domain resource or resource pool of the first control area includes any one or more of: a number of second time units occupied by the first control area in a first time unit, a number of orthogonal frequency division multiplexing (OFDM) symbols in a second time unit, and a sending period or a subframe offset of the first control area; where a time unit includes a preset number of the second time units.

In an embodiment of the present disclosure, the indication information of the spatial domain resource or resource pool of the first control area includes: any one or more of a beam number indication parameter, a beam index indication parameter, a transmission layer number indication parameter, a sending sector indication parameter.

In an embodiment of the present disclosure, the indication parameter of the frequency domain resource or resource pool of the first control area at least includes: any one of an indication parameter of an occupied subcarrier group or an indication parameter of an occupied resource block group.

In an embodiment of the present disclosure, the sending power configuration indication information of the first control area includes: any one or more of a power offset of demodulation pilot/measurement pilot and the control information in the first control area, a power offset of demodulation pilot/measurement pilot and the control information in the second control area, and a power offset of the first control area and the second control area.

In an embodiment of the present disclosure, the pilot configuration indication information of the first control area at least includes any one of: reference demodulation pilot configuration indication information or measurement pilot configuration indication information of symbols in which the first control area is located.

In an embodiment of the present disclosure, the channel structure indication information of the first control area includes: mapping indication information of each channel or signal on the symbols in which the first control area is located.

An embodiment of the present disclosure provides another information sending method. The method includes: determining, by a base station, physical layer control information; determining a transmission parameter of the physical layer control information according to first information used for representing an attribute of the physical layer control information; and sending the transmission parameter.

In an embodiment of the present disclosure, before sending the transmission parameter, the method further includes: determining the transmission parameter of the physical layer control information according to second information; where the second information includes any one or more of: configuration of a current subframe, a total number of symbols of a downlink area and Numerology configuration.

In an embodiment of the present disclosure, the first information includes any one or more of: a type of control information, a format of the control information, an overhead of the control information, a scrambling method of the control information, and a use of the control information.

In an embodiment of the present disclosure, the transmission parameter includes any one or more of: a transmission resource parameter, a transmission technology indication parameter and a demodulation pilot configuration indication parameter.

An embodiment of the present disclosure provides another information detecting method. The method includes: determining a transmission parameter of physical layer control information; and detecting the physical layer control information according to the transmission parameter of the physical layer control information.

In an embodiment of the present disclosure, the determining the transmission parameter of the physical layer control information includes:

receiving the transmission parameter of the physical layer control information; or determining the transmission parameter of the physical layer control information according to first information, where the first information is used for representing an attribute of the physical layer control information.

In an embodiment of the present disclosure, after determining the transmission parameter of the physical layer control information according to the first information, the method further includes: determining the transmission parameter of the physical layer control information according to second information; where the second information includes any one or more of: configuration of a current subframe, a total number of symbols of a downlink area and Numerology configuration.

In an embodiment of the present disclosure, the first information includes any one or more of: a type of control information, a format of the control information, an overhead of the control information, a scrambling method of the control information, and a use of the control information.

In an embodiment of the present disclosure, the transmission parameter includes any one or more of: a transmission resource parameter, a transmission technology indication parameter and a demodulation pilot configuration indication parameter.

An embodiment of the present disclosure provides another information sending method. The method includes: determining to send common control information on N time domain units; and determining to send dedicated control information on M time domain units of the N time domain units; where N is an integer greater than zero, and M is a subset of N.

In an embodiment of the present disclosure, the determining to send the dedicated control information on the M time domain units of the N time domain units includes: determining, according to radio resource control configuration or C-RNTI of the user equipment, to send the dedicated control information on the M time domain units of the N time domain units; or determining, according to channel state information feedback of the UE, to send the dedicated control information on the M time domain units of the N time domain units; or sending, according to a selected sector identification code, the dedicated control information on the M time domain units.

An embodiment of the present disclosure provides another information detecting method. The method includes: detecting common control information in a first area; and detecting dedicated control information in a second area. In a transmission time interval, the first area includes N time domain units, and the second area includes M time domain units. The M time domain units are a subset of the N time domain units, and M and N are integers greater than zero.

In an embodiment of the present disclosure, the subset is determined according to radio resource control configuration or C-RNTI of the user equipment; or the subset is determined according to channel state information feedback from the UE; or the subset is determined according to a selected sector identification code; or the subset is determined according to a type of a subframe; or the subset is determined according to a value of M.

An embodiment of the present disclosure further provides a computer storage medium, which is configured to store executable instructions for executing the information processing method in the embodiments described above.

The embodiments of the present disclosure provide an information processing method, a terminal and a base station. The base station determines a transmission configuration parameter associated with a first control region, where the first control region is used for transmitting a common control message; determines first indication information according to the transmission configuration parameter, where the first indication information is used for indicating a configuration of the transmission configuration parameter; and sends the first indication information. The user equipment receives the first indication information, where the first indication information is used for indicating the transmission configuration parameter of the first control area, and the first control area is used for transmitting common control information; parsing the first indication message and acquiring the transmission configuration parameter of the first control area, and detecting the common control information according to the transmission configuration parameter of the first control area. So that the base station can flexibly adjust sending resources of the common control information according to the determined transmission configuration parameter, and send the first indication information for indicating the configuration of the transmission configuration parameter through the physical downlink broadcast channel, thereby effectively improving the transmission efficiency and utilization of the resources.

SUMMARY

For a better understanding of embodiments of the present disclosure, a control channel of a radio communication system will be further described below.

A search space in the radio communication system includes a common search space and a dedicated search space, and the search space also is a control channel. Correspondingly, the control channel includes a common control channel and a dedicated control channel. In general, the common search space/the common control channel is shared by multiple user equipments (UEs), and the dedicated search space/control channel is used by a certain specific UE. Common control information is usually transmitted in a physical downlink control channel or a downlink physical broadcast channel (PBCH). When the common control information is transmitted in the PBCH, the PBCH may be understood as a special type of the common control channel.

In a low frequency Long Term Evolution (LTE) system, both the common control channel and the dedicated control channel focus on ensuring an accuracy rate of control signaling. Therefore, a relatively robust transmission mechanism is generally adopted without relying on multiple-input multiple-output (MIMO) channel state information (CSI) feedback. For example, the physical downlink control channel (PDCCH) in the LTE adopts a transmission manner of a space frequency block code (SFBC) with a diversity technique or a diversity transmission mechanism combining the SFBC and frequency switch transmit diversity (FSTD), which has the advantages of high robustness, no feedback, being capable of covering all UEs and adopting a low-order modulation code.

Figure 1:
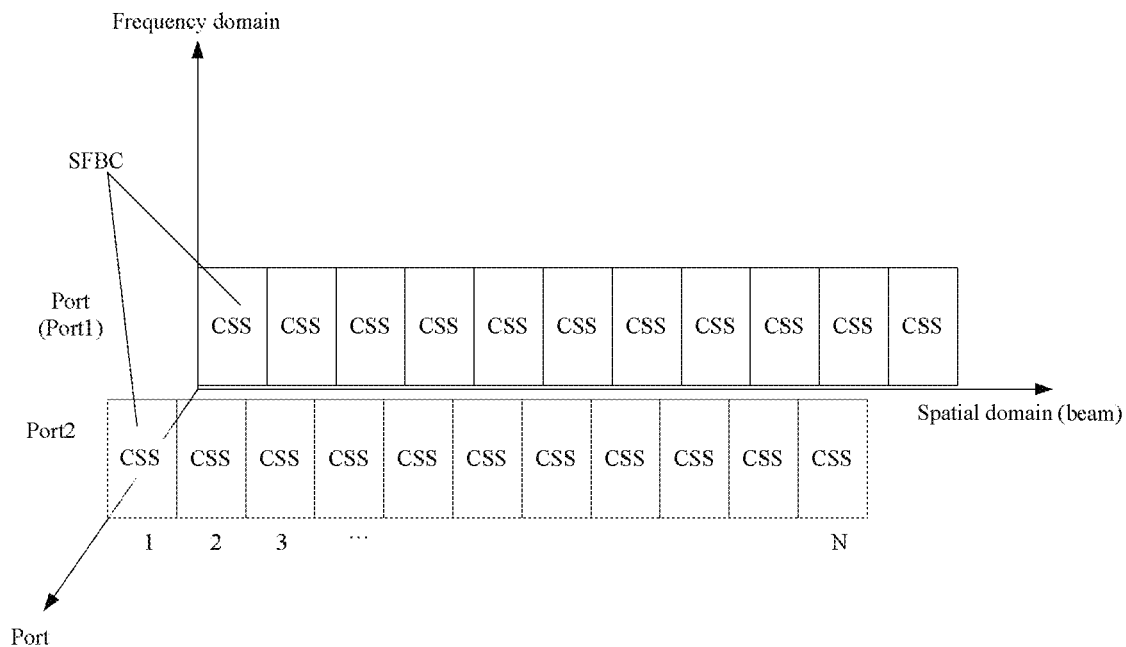
FIG. 1 is schematic diagram of a common control information sending or a blind detection in a common search space in the existing art.

In a high frequency system, since a path loss in the high frequency system is greater than a path loss in the low frequency system by dozens of dBs, the coverage range of the control channel is a problem of concern. In this case, the error rate and the coverage range of the control channel are ensured by introducing the beamforming technology and repeatedly transmitting information with larger redundancy. To improve the transmission efficiency and robustness of the control channel, since the common control information is common to all UEs in the cell, the transmission is always performed by scanning with multiple narrow beams, and each beam may corresponds to two ports to perform diversity coding transmission. Correspondingly, a schematic diagram showing the transmission of the common control information or the blind detection of the common search space in the existing art is shown in FIG. 1.

Figure 2:
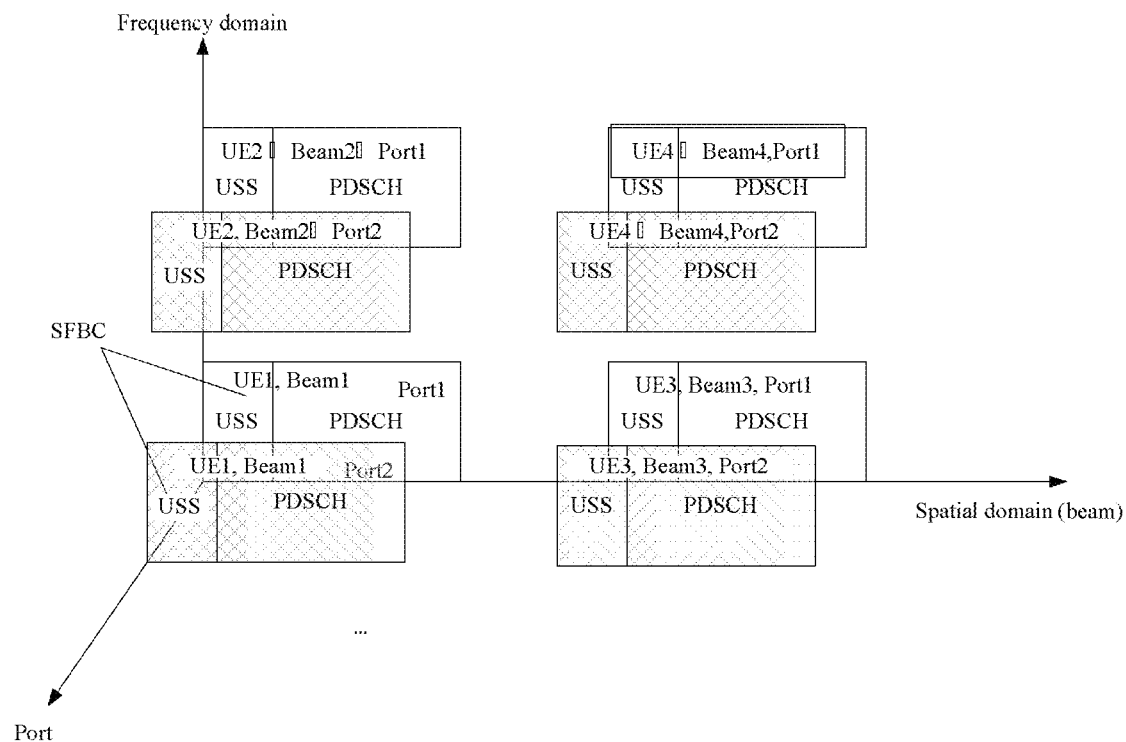
FIG. 2 is schematic diagram of a dedicated control information sending or a blind detection in a common search space in the existing art.

The dedicated control information is for a specific UE in the cell. Therefore, in the case of reciprocity, the receiving beams may be acquired by using the access signal received in uplink access, and it is reciprocated to the downlink transmitting beam and transmitted by using a single narrow beam. This beam may correspond to two ports for diversity coding transmission. In a time domain symbol group including one or more Orthogonal Frequency Division Multiplexing (OFDM) symbols, the frequency domain is for multiple terminals. Therefore, multiple users may share one group of time domain symbols for multiplexing. Correspondingly, a schematic diagram of the transmission of the dedicated control information or the blind detection of the common search space in the existing art is shown in FIG. 2.

Method Embodiment One

Figure 3:
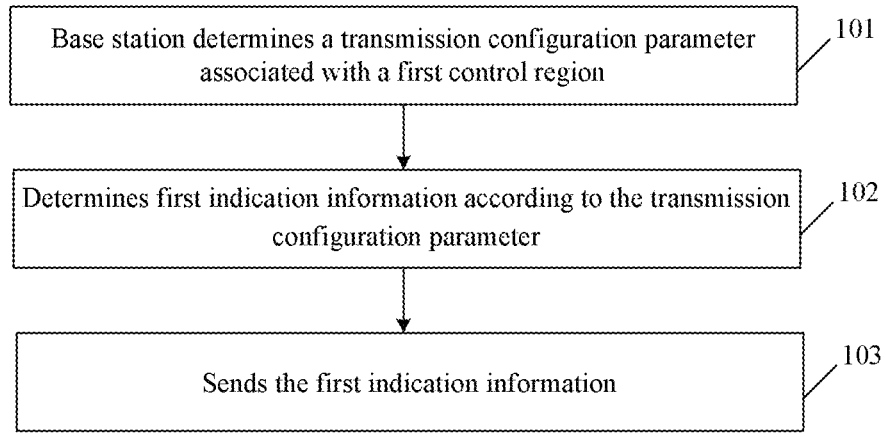
FIG. 3 is a processing flowchart of an information sending method according to an embodiment of the present disclosure.

In the embodiment of the present disclosure, a processing flowchart of an information sending method is shown in FIG. 3, and includes the steps described below.

In step 101, a base station determines a transmission configuration parameter associated to a first control area.

Specifically, the base station determines the transmission configuration parameter associated to the first control area according to parameters such as a signal-to-noise ratio and transmission channel quality.

Here, the first control area is used for transmitting a common control message. The first control area is an available sending resource pool. Part or all of resources in the first control area may be used for sending the common control message. The base station may flexibly decide to use how many resources. Alternatively, all resources in the area are used for sending the common control message according to the convention of the base station and the terminal.

Target users of the common control information may be all users in the coverage of the base station, or may be part of users in the coverage of the base station.

In the embodiment of the present disclosure, the transmission configuration parameter of the first control area includes any one or more of: indication information of a time domain resource or a time domain resource pool of the first control area, indication information of a spatial domain resource or a spatial domain resource pool of the first control area, an indication parameter of a frequency domain resource or a frequency domain resource pool of the first control area, sending power configuration indication information of the first control area, pilot configuration indication information of the first control area, and channel structure indication information of the first control area.

The indication information of the time domain resource or resource pool of the first control area includes any one or more of: the number of second time units occupied by the first control area in a first time unit, the number of OFDM symbols in the second time unit, and a sending period or a subframe offset of the first control area; where a time unit includes a preset number of second time units.

The indication information of the spatial domain resource or resource pool of the first control area includes any one or more of: a beam number indication parameter, a beam index indication parameter, a transmission layer number indication parameter and a sending sector indication parameter.

The indication parameter of the frequency domain resource or resource pool of the first control area includes: an indication parameter of an occupied subcarrier group or an indication parameter of an occupied resource block group.

The sending power configuration indication information of the first control area includes any one or more of: a power offset of demodulation pilot/measurement pilot and the control information in the first control area, a power offset of the first control area and the second control area, and a power offset of demodulation pilot/measurement pilot and the control information in the second control area.

The pilot configuration indication information of the first control area includes any one of: reference demodulation pilot configuration indication information or measurement pilot configuration indication information of symbols occupied by the first control area.

The channel structure indication information of the first control area includes: mapping indication information of each channel or signal on the symbols occupied by the first control area. Here, a symbol group where the first control area channel is located is divided into multiple subgroups, and symbols in each subgroup use a same transmitting beam/sequence.

In step 102, according to the transmission configuration parameter, first indication information is determined.

Here, the first indication information is used for indicating configuration of the transmission configuration parameter.

In step 103, the first indication information is sent.

Figure 4:
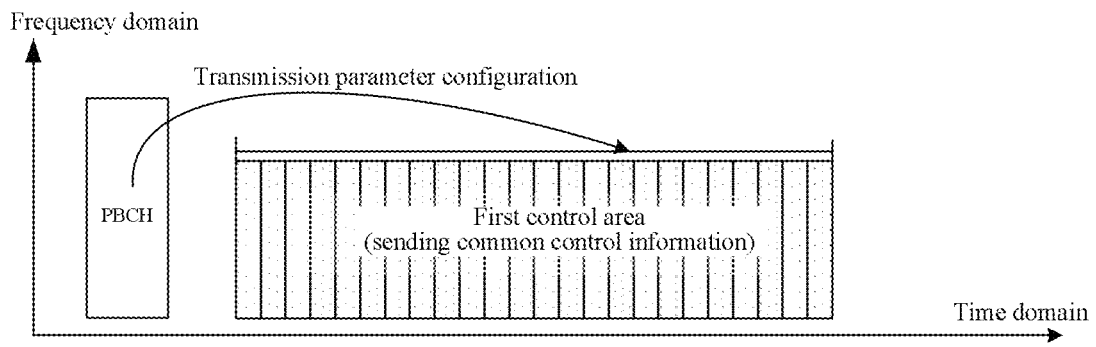
FIG. 4 is a schematic diagram of an implementation mode of sending first indication information by a base station according to an embodiment of the present disclosure.

Specifically, an embodiment in which the base station sends the first indication information is shown in FIG. 4. The base station may send the first indication information through a physical downlink broadcast channel.

Figure 5:
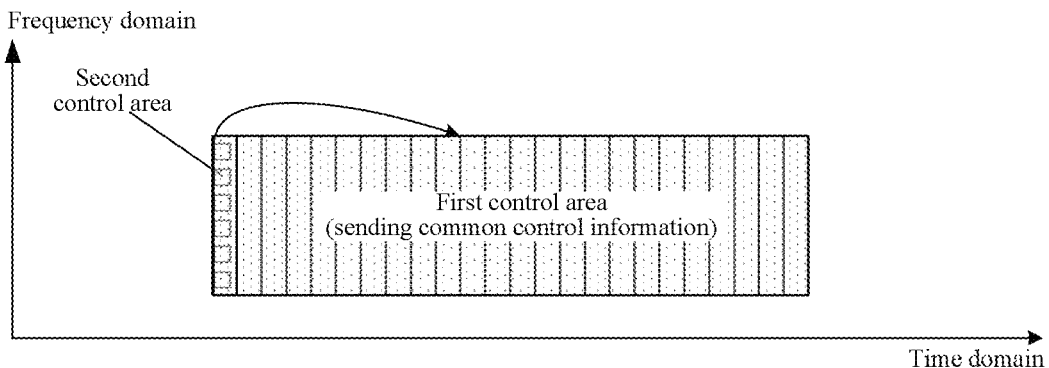
FIG. 5 is a schematic diagram of another implementation mode of sending first indication information by a base station according to an embodiment of the present disclosure.
Figure 6:
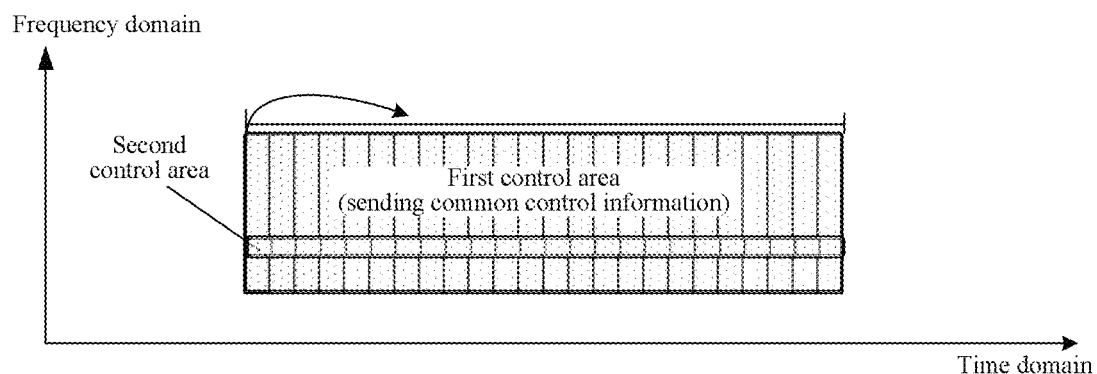
FIG. 6 is a schematic diagram of another implementation mode of sending first indication information by a base station according to an embodiment of the present disclosure.

Two embodiments in which the base station sends the first indication information are shown in FIGS. 5 and 6. The base station sends the first indication information at a preset position in the second control area. A time domain symbol set corresponding to the second control area is a subset of a time domain symbol set corresponding to the first control area.

Here, the second control area and the first control area are time-division multiplexed. The number of symbols included in one symbol group in the first control area is greater than or equal to the number of symbols included in one symbol group in the second control area. The number of symbol groups in the first control area is less than or equal to the number of symbol groups in the second control area. The symbol group represents the minimum time unit, allowing time domain interpolation, of a demodulation reference signal port, that is, the symbol group is the minimum time unit for beam switching of the demodulation reference signal port. For example, one demodulation reference signal port number corresponds to different transmitting beams in different symbol groups, or different receiving beams correspond to the same transmitting beam in the same symbol group.

Figure 7:
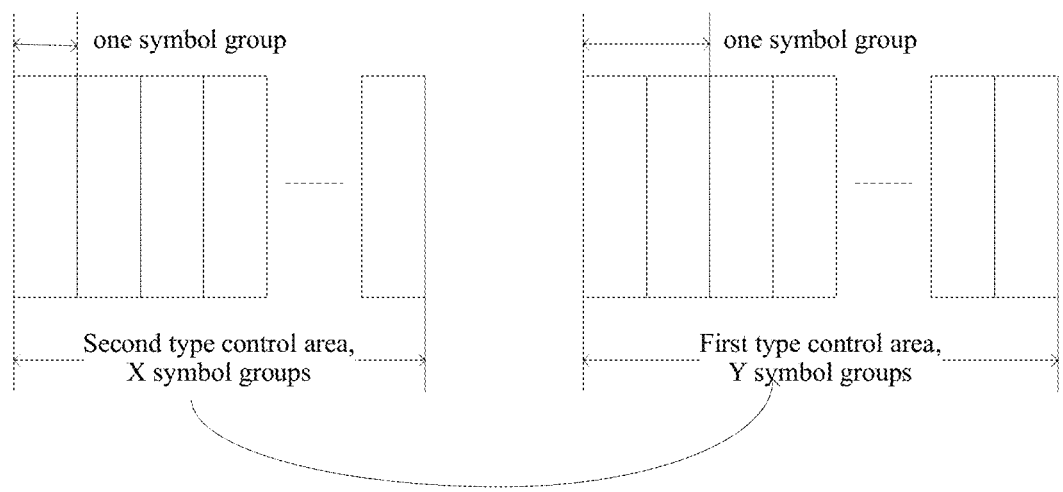
FIG. 7 is a schematic diagram of an implementation mode of sending first indication information by a base station in a second control area according to an embodiment of the present disclosure.

In the embodiment of the present disclosure, as shown in FIG. 7, when the base station sends the first indication information in the second control area, the second control area includes X symbol groups, and each symbol group includes xn=1 OFDM symbol. The first control area includes Y symbol groups, and each symbol group includes yn=2 OFDM symbols. X is greater than or equal to Y and xn is greater than or equal to yn. xn and yn shown in FIG. 7 are merely examples in the embodiment of the present disclosure, and other values are not limited. Here, the symbol groups in the first control area and the symbol groups in the second control area have a correspondence relationship. The correspondence relationship is an one-to-one correspondence, or each of the symbol groups in the first control area corresponds to one or more symbol groups in the second control area. The first indication information is further used for notifying a sending period of the first control area.

Method Embodiment Two

Figure 8:
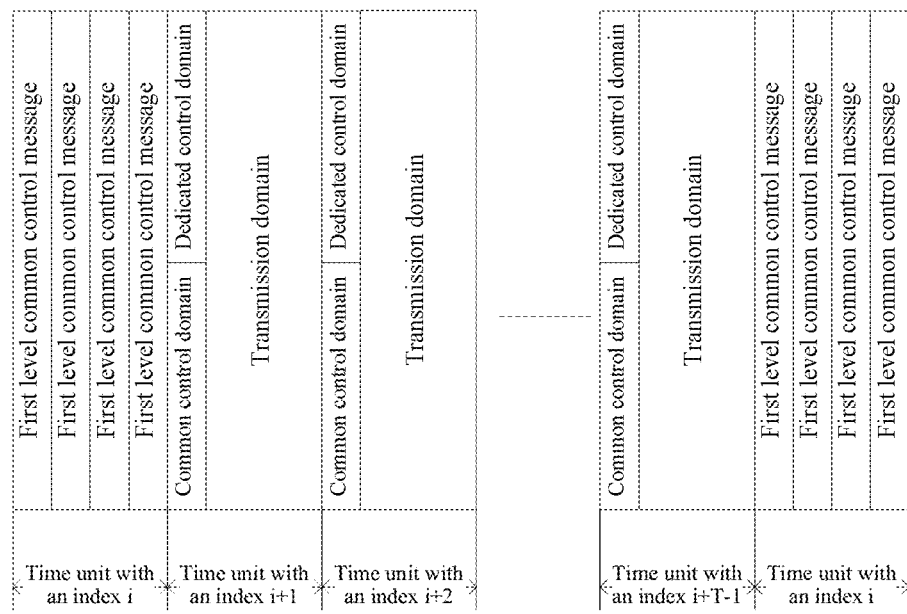
FIG. 8 is a processing flowchart of a method of sending common control information according to first indication information according to embodiment two of the present disclosure.

In the embodiment two of the present disclosure, common control information is divided into a first level common control message and a second level common control message. A processing flowchart of a method of sending the common control information according to first indication information is shown in FIG. 8. The method includes:

A period is T time units. A terminal sends the first level common control message on one time unit in one period. The terminal sends the second level common control message on any time unit between two adjacent first level common control messages.

Here, the terminal needs to detect the second level common control message from a time unit with an index i to a time unit with an index i+T−1.

In the embodiment of the present disclosure, target users of the first level common control message are all users in a cell, and the target user of the second level common control message in each time unit is a user group, such as a resource group including scheduling users in the time unit. Through the embodiment of the present disclosure, the second level common control message may be sent as needed with ensuring the periodic transmission of the first level common control message.

Method Embodiment Three

Figure 9:
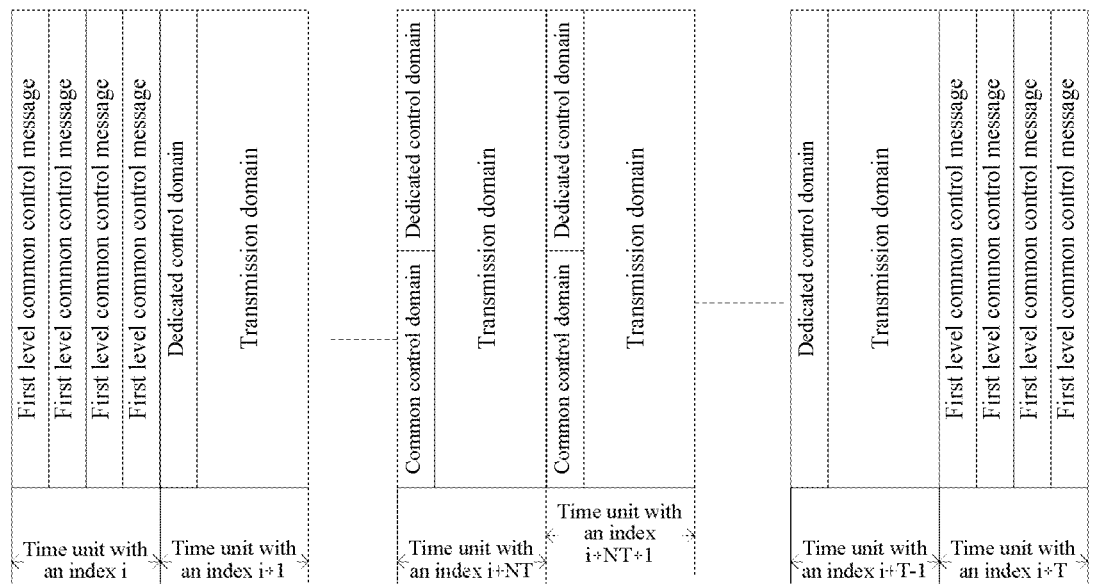
FIG. 9 is a processing flowchart of a method of sending common control information by a terminal according to received first indication information according to embodiment three of the present disclosure.

In the embodiment three of the present disclosure, a processing flowchart of a method of the terminal sending common control information according to received first indication information is shown in FIG. 9. The method includes:

The first indication information received by the terminal indicates indexes of time units, between two first level common control messages, where the terminal needs to detect the second level common control message, or a starting index and an ending index of these time units. The terminal performs the detection of the second level common control information only on the indicated time units, and does not perform the detection of the second level common control information on unindicated time units.

Here, the first level common control information and the second level common control information may be used for transmitting the same type of common control message. However, a transmission period of the first level common control information is different from that of the second level common control information, or the target user of the first level common control information is different the target user of the second level common control information.

The transmission configuration parameter in the above embodiments of the present disclosure includes indication information of a time domain resource or time domain resource pool of a first control area, and the indication information includes any one or more of: the number of second time units occupied by the first control area in a first time unit, the number of orthogonal frequency division multiplexing (OFDM) symbols in the second time unit, and a sending period or a subframe offset of the first control area.

Specifically, the first time unit may be a subframe in the LTE, and the second time unit is a minimum time unit for beams switching or a minimum time unit of a for time domain interpolation. Here, one second time unit may be one OFDM symbol, or one second time unit includes multiple OFDM symbols. Here, one first time unit includes a preset number of second time units.

In the above embodiments of the present disclosure, through the transmission of the above resource configuration parameter, the number of time domain resources in the common control area is dynamically adjusted, and the resources are effectively utilized.

Figure 10A:
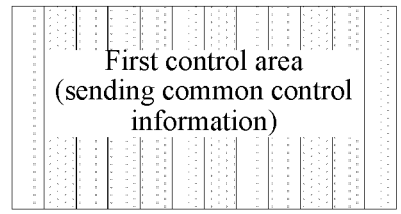
FIGS. 10A, 10B and 10C are schematic diagrams illustrating that common public control areas occupy different numbers of symbols according to an embodiment of the present disclosure.
Figure 10B:
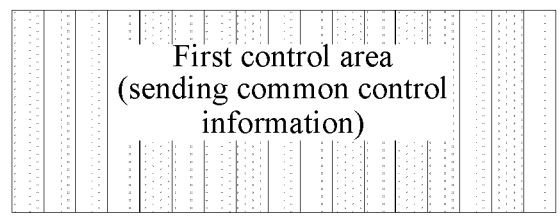
Figure 10C:
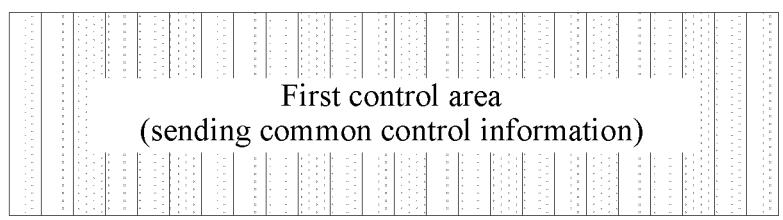

In the above embodiments of the present disclosure, as shown in FIGS. 10A, 10B and 10C, the number of symbols occupied by the common control area may be changed according to actual conditions. In this way, different time domain resources are adopted for different common control message loads, such that the common control message is transmitted as needed. For example, the common control message is only sent to a beam currently with resident users.

Figure 11A:
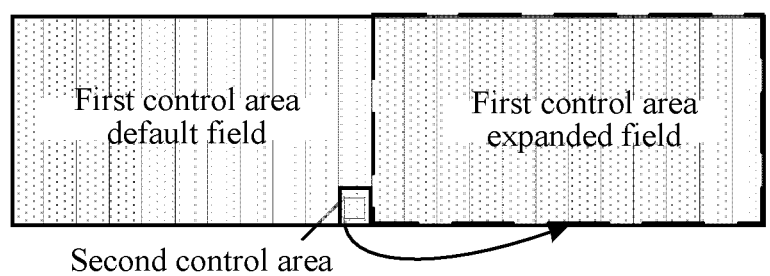
FIG. 11A is a schematic diagram of sending first indication information in a second control area in a first control default field according to an embodiment of the present disclosure.
Figure 11B:
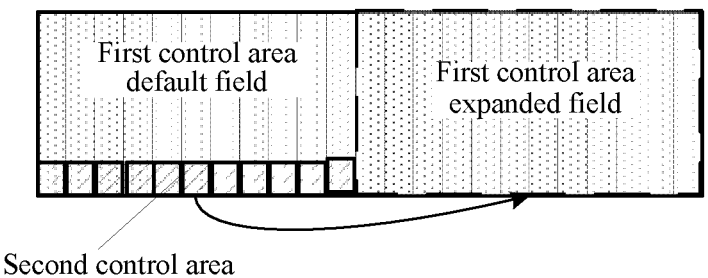
FIG. 11B is another schematic diagram of sending first indication information at a second control area in a first control default field according to an embodiment of the present disclosure.

In the above embodiments of the present disclosure, a schematic diagram of sending the first indication information in the second control area in a first control default field is shown in FIGS. 11A and 11B. The first control area has a default transmission field, and the second control area is at a convention position in the default transmission field, the second control area indicates whether an extended field of the first control area exists, and a size of the time domain resource of the extended field. In FIG. 11A, the second control area only occupies part of OFDM symbols of the first control area. Therefore, it may be considered that all of the symbols in the default first control area correspond the same transmitting beams, or correspond the same receiving beams. In FIG. 11b, there is a corresponding second control area on each OFDM symbol, therefore, it may be considered that the transmitting beams on the OFDM symbols in the default first control area are different, or the receiving beams on the OFDM symbols are different.

Figure 11C:
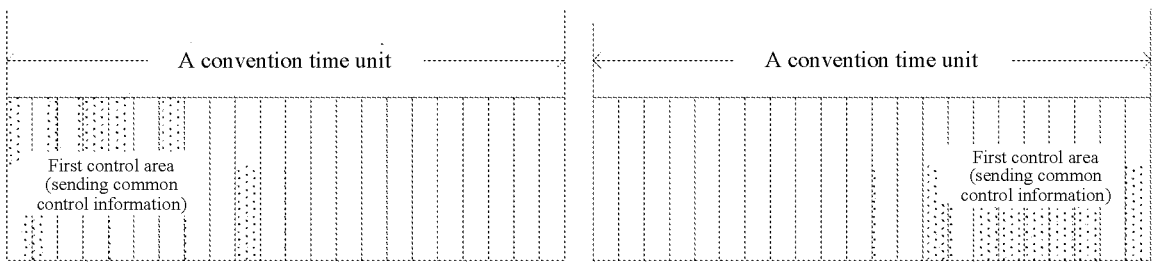
FIG. 11C is a schematic diagram of notifying subframe configuration by first indication information according to an embodiment of the present disclosure.

In the embodiment of the present disclosure, interference coordination is implemented through notifying a subframe offset of the first control area in the PBCH, or it is notified in the PBCH that the first control area occupies first N symbols or last N symbols of a convention time unit such that the first control area does not overlap with others. The notifying subframe configuration by the first indication information is shown in FIG. 11c, a common control area is divided into two parts, thereby implementing the interference coordination of the common control information among different cells. The above dividing the common control area into two parts is merely one example, the common control area may also be divided into multiple parts, one of the multiple parts of the common control area is notified of the subframe configuration, thereby implementing the interference coordination of the common control information among different cells.

The transmission resource configuration parameter of the first control area in the embodiment of the present disclosure includes indication information of a spatial domain resource/spatial domain resource pool, such as any one or more of a beam number indication parameter, a beam index indication parameter, a transmission layer number indication parameter and a sending sector indication parameter.

Specifically, the total number of transmitting beams of the base station is obtained through a broadcast message and/or a synchronization message and/or a beam training reference signal, and the total number of transmitting beams is NB. After acquiring a logical number of each beam according to the broadcast message and/or the synchronization message and/or the beam training reference signal, one or more of the following parameters corresponding to the first control area may be indicated in the first indication information: the beam number indication parameter, the beam index indication parameter, the transmission layer number indication parameter and the sending sector indication parameter.

Figure 12:
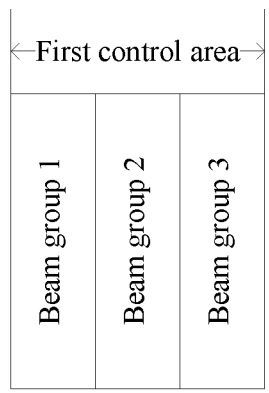
FIG. 12 is a schematic diagram of notifying beam groups by first indication information according to an embodiment of the present disclosure.

In the embodiment of the present disclosure, FIG. 12 is a schematic diagram showing notifying beam groups by the first indication information. The first indication information indicates that the first control area corresponds to three beam groups, and the number of beam groups of the base station is six, and thus the common control message is sent as needed. Alternatively, the common control information is only sent using the beam group with activated users, and then beam index information of beams in each beam group is notified, thereby more flexibly sending the common control information.

Figure 13A:
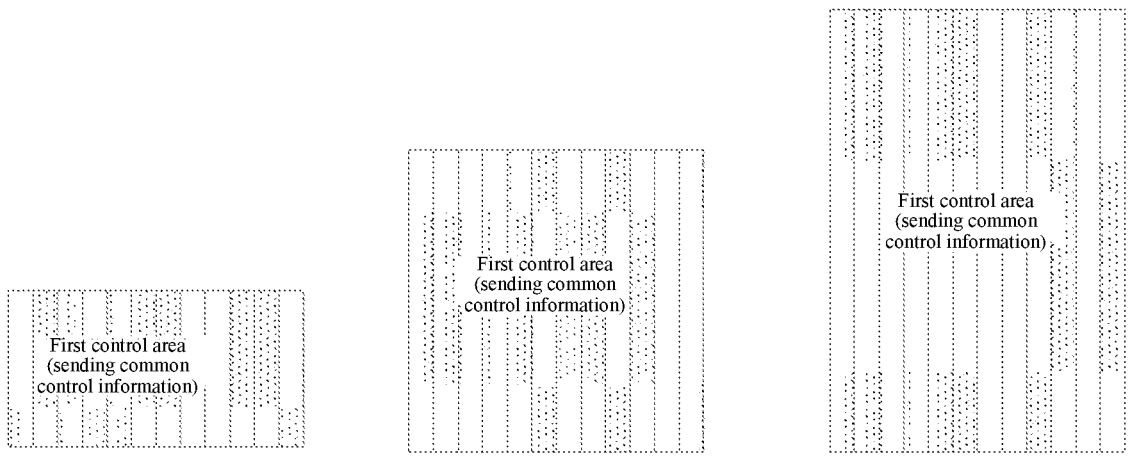
FIGS. 13A, 13B and 13C are schematic diagrams of different frequency domain occupations of first control areas indicated by first indication information according to an embodiment of the present disclosure.
Figure 13B:
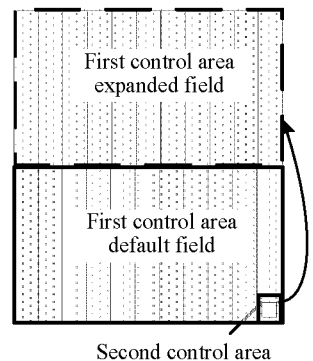
Figure 13C:
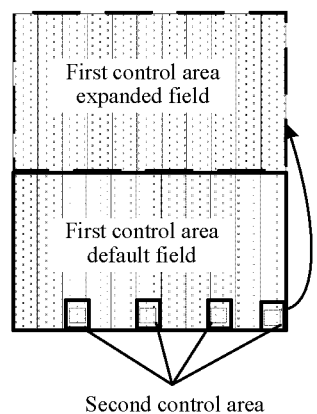

In the embodiment of the present disclosure, the transmission resource configuration parameter of the first control area includes an indication parameter of a frequency domain resource/resource pool, such as an indication parameter of a subcarrier group occupied by the first control area or an indication parameter of a resource block group occupied by the first control area. FIG. 13A, FIG. 13B, and FIG. 13C are schematic diagrams showing different frequency domain occupations of the first control area indicated by the first indication information. Here, as shown in FIG. 13A, different amounts of frequency domain resources are configured for the first control area. As shown in FIGS. 13b and 13c, the first control area has a default frequency domain occupation position. The default frequency domain occupation position includes the second control area which indicates whether a frequency domain extended field of the first control area exists, and/or a size of the frequency domain extended field of the first control region. Here, as shown in FIG. 13b, all time domain symbols in the default first control area have the same transmitting beam or the receiving beam. As shown in FIG. 13c, different time domain symbol groups of the default first control area use different transmitting symbols, or have different receiving beams. Each transmitting symbol group includes that the second control area which indicates whether the frequency domain extended field of the first control area exists, and/or a size of the frequency domain resource of the frequency domain extended field of the first control region.

In the embodiment of the present disclosure, the transmission resource configuration parameters include sending power configuration indication information, such as any one or more of a power offset of demodulation pilot/measurement pilot and the control information in the first control area, a power offset of demodulation pilot/measurement pilot and the control information in the second control area, and a power offset of the first control area and the second control area. As shown in FIG. 6, when the demodulation reference signal of the first control area and the demodulation reference signal of the second control area are used together as the measurement pilot, an area occupied by the transmission resource configuration information associated with the first control area is hardly changed, and the area occupied by the transmission resource configuration information associated with the first control area is indicated by the second control area, which is relatively flexible. To ensure the coverage consistency of the first control area and the second control area, it is necessary to notify the power offset of the first control area and the second control area and further improve a sending power of the first control area, so that the terminal performs channel measurement by using the demodulation reference signals of the two control areas to obtain an accurate channel measurement result. Alternatively, when the sending power of the demodulation pilot of the first control area and the sending power of the demodulation pilot of the second control area are the same, and sending power of the control information of the first control area is different from sending power of the control information of the second control area, the power offset between the demodulation pilot and the control information in each control area is notified, so that the terminal is capable of reasonably demodulating the control information corresponding to the demodulation reference signal in each area.

In the embodiment of the present disclosure, the transmission resource configuration parameters include pilot configuration indication information, such as any one or more of demodulation pilot configuration indication information and measurement pilot configuration indication information of symbols where the first control area is located. Specifically, the demodulation pilot configuration indication information includes one or more of: the number of demodulation pilots, a demodulation pilot port set, a time domain position of the demodulation pilot, a code domain resource of the demodulation pilot, a load of the demodulation pilot, and a port multiplexing manner of the demodulation pilot port set. The measurement pilot configuration indication information of the symbols where the first control area is located means that when the first control area further includes beam measurement pilot, the number of ports and the port set where the beam measurement pilot is configurable; or whether demodulation reference pilot for configuring the first control area may be used as the beam measurement pilot. If the demodulation reference pilot is used as the beam measurement pilot; the measurement pilot configuration indication information further indicates a set of demodulation pilots which can be used as the beam measurement pilot. Part of demodulation reference signal ports may be selected to be used as the beam measurement pilot. Alternatively, the measurement pilot configuration indication information indicates the demodulation pilot and additional beam measurement pilot may be together used as the beam measurement pilots. Alternatively, the measurement pilot configuration indication information indicates the corresponding beam measurement pilot configuration of each demodulation pilot.

In the embodiment of the present disclosure, the transmission resource configuration parameters further include channel structure indication information, such as mapping indication information of each channel/signal on the symbols where the first control area is located. Specifically, the channel structure indication information indicates that the following channels/signals are on the OFDM symbols where the first control area is located. For example, the first structure is that both the common control and the beam measurement reference signal (BRS) are on the symbols in which the first control area is located. The second structure is that data and the common control are on the symbols in which the first control area is located, in this case, the data may be general traffic data, and may also be a common control message indicated by the common control information. The third structure is that the common control and the dedicated control are on the symbols in which the first control area is located. The fourth structure is that the common control and a BRS dedicated control channel are on the symbols in which the first control area is located. Occupation resources of different channels/signals in the first control area may be pre-appointed. Alternatively, the resource allocation of different channels/signals is indicated by the first indication information in the second control area, or the resource allocation of different channels/signals is indicated by preset common control information of the first control area.

Figure 14:
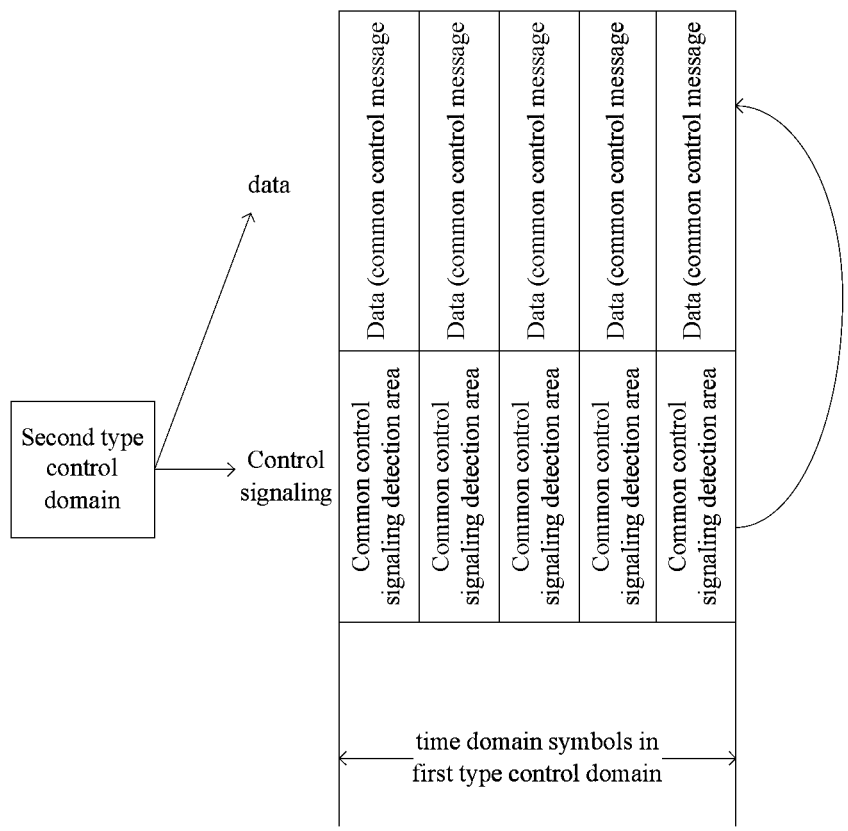
FIG. 14 is a schematic diagram of a channel structure and resource occupation of each channel of a first control area indicated by first indication information according to an embodiment of the present disclosure.

Specifically, FIG. 14 is a schematic diagram showing the channel structure of the first control area and resource occupation of each channel indicated by the first indication information. When the first indication information indicates that each symbol in the first control area is in the second structure, the first indication information may also further indicate the resource occupation of the control area and the data area of the first control area. The control area and the data area in FIG. 14 are in frequency division manner. Of course, the control area and the data area may also be in other occupation manner. The terminal detects common control signaling information in the control area of the first control area according to the first indication information, and demodulates data in the data area according to the indication of the common control signaling information. Here, the common control area may include multiple pieces of common control signaling, and different pieces of control signaling transmit different common control signaling information. Here, the common control information transmitted in the first control area includes the common control signaling information and the common control message transmitted in data channel. The common control signaling information indicates transmission information of the common control message transmitted in data channel, such as the resource occupation and MCS.

In the embodiment of the present disclosure, the common control message includes the common control signaling information and the common control message transmitted in data channel, which may reduce the blind detection complexity of the terminal. For example, for the common control message which may be transmitted or may not be transmitted in the first common control area, the terminal needs to blindly detect the common control message. Furthermore, a transmission aggregation degree of the common control message also needs blind detection. If the common control message is divided into the above parts, the terminal only needs to blindly detects the common control signaling information, reducing the blind detection complexity of the terminal.

Figure 15A:
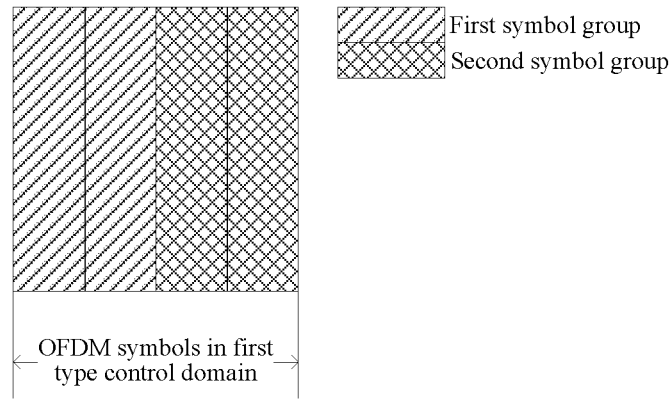
FIGS. 15A and 15B are schematic diagrams of symbol group division indicated by first indication information according to an embodiment of the present disclosure.
Figure 15B:
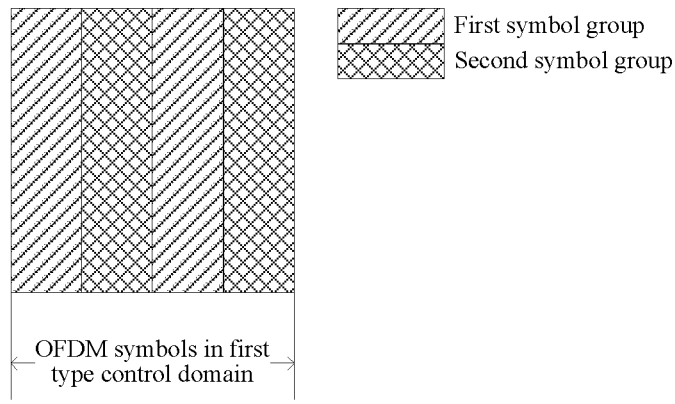

In the embodiment of the present disclosure, the transmission resource configuration parameters further include an indication indicating that the symbol group in which the first control area is located is divided into multiple subgroups, symbols in each subgroup uses the same transmitting beam/sequence. In this case, the first indication information indicates any one or more of the number of groups, the number of symbols in each group, symbol indexes of symbols in each group. In actual applications, one demodulation reference signal port may perform time domain interpolation in one subgroup. Since the transmitting beams or receiving beams corresponding to different groups are different, the time domain interpolation cannot be performed for the same demodulation reference signal port in different group. FIGS. 15A and 15B show symbol group divisions indicated by the first indication information, the time domain symbols of the first control area are divided into two groups, symbols in each group may be consecutive or discrete.

In the embodiment of the present disclosure, one implementation mode of the transmission resource configuration parameters of the first control area included in the first indication information may also be that the first indication information indicates that the transmission resource configuration parameters of the first control area is one set of multiple appointed sets of transmission resource configuration parameters.

For the manner of determining the time-frequency resources where the second control area is located, a first implementation mode in this embodiment is that a position of the second control area is not changed with time. A second implementation mode is that the position of the second control area is different as the time unit is different. However, the position may be obtained before the time unit in which the second control area is located arrives according to a rule appointed by the base station and the terminal, for example, a parameter for determining the resource occupied by the second control area includes time unit index information. A third implementation mode is that the parameter for determining the resource occupied by the second control area includes a frame structure parameter and a numerology parameter. Therefore, different sending manners of the second control area may be designed for different numerology configurations, different frame structures. A fourth implementation mode is that the parameter for determining the area occupied by the second control area includes type information of all common control messages. Therefore, different second control areas may be designed for different common control messages. For example, if the length of the common control message is small, the transmission process may be completed in a default area of the first control area without participating of the second control area. For the long common control message, its transmission process cannot be completed in the default area of the first control area and it is necessary to indicate the extended area and/or a resource size of the extended area and/or a resource position of the extended field of the first control area by using the second control information. Therefore, the terminal can determine the second control area according to the type of the detected common control information.

The process of sending the first indication information in the second control area includes: sending the first indication information by sending the control signaling in the second control area, or sending the first indication information by sending a sequence in the second control area. The sequence and the first indication information have a corresponding relationship. The corresponding relationship is pre-appointed by the base station and UE, that is, the sequence carries the first indication information. The sequence also has other functions in addition to indicating the first indication information, such as serving as measurement pilot, serving as demodulation reference signal pilot, serving as a synchronization signal, or notifying broadcast information.

Method Embodiment Four

Figure 16:
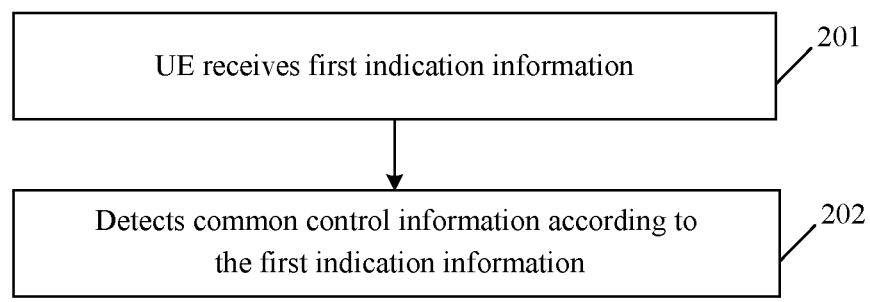
FIG. 16 is a processing flowchart of an information detecting method according to embodiment four of the present disclosure.

A processing flowchart of an information detecting method is shown in FIG. 16, including the steps described below.

In step 201, a user equipment receives first indication information.

Specifically, the UE receives the first indication information on a physical downlink broadcast channel or in a second control area.

Here, the first indication information is used for indicating a transmission configuration parameter of a first control area. The first control area is used for transmitting the common control information. A time domain symbol set corresponding to the second control area is a subset of a time domain symbol set corresponding to the first control area.

In step 202, according to the first indication information, the common control information is detected.

Specifically, the UE detects the common control information according to the transmission configuration parameter of the first control area in the first indication information.

Here, the transmission configuration parameter includes any one or more of: indication information of a time domain resource or resource pool of the first control area, indication information of a spatial domain resource or resource pool of the first control area, an indication parameter of a frequency domain resource or resource pool of the first control area, sending power configuration indication information of the first control area, pilot configuration indication information of the first control area, and channel structure indication information of the first control area.

The indication information of the time domain resource or resource pool of the first control area includes any one or more of: the number of second time units occupied by the first control area in a first time unit, the number of OFDM symbols in the second time unit, and a sending period or a subframe offset of the first control area; where a time unit includes a preset number of the second time units.

The indication information of the spatial domain resource or resource pool of the first control area includes any one or more of: a beam number indication parameter, a beam index indication parameter, a transmission layer number indication parameter and a sending sector indication parameter.

The indication parameter of the frequency domain resource or resource pool of the first control area at least includes any one of: an indication parameter of a subcarrier group occupied by the first control area or an indication parameter of a resource block group occupied by the first control area.

The sending power configuration indication information of the first control area includes any one or more of: a power offset of demodulation pilot/measurement pilot and the control information in the first control area, a power offset of demodulation pilot/measurement pilot and the control information in the second control area, and a power offset of the first control area and the second control area.

The pilot configuration indication information of the first control area at least includes: any one of reference demodulation pilot configuration indication information or measurement pilot configuration indication information of symbols in which the first control area is located.

The channel structure indication information of the first control area includes: mapping indication information of each channel or signal on the symbols in which the first control area is located.

Figure 17:
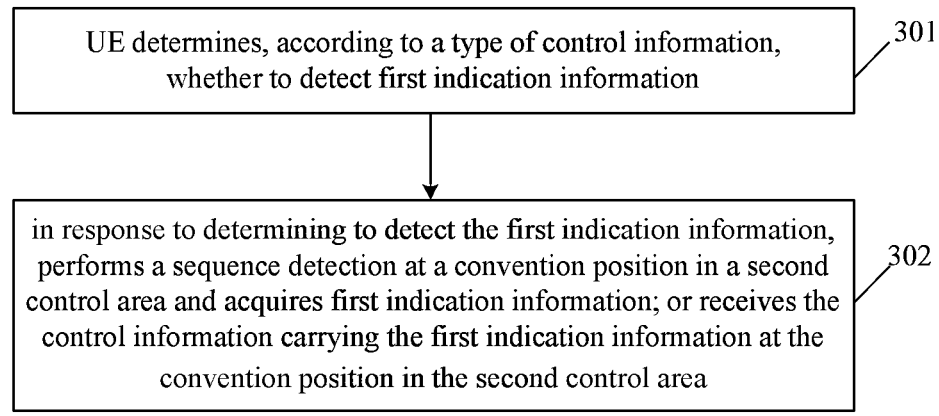
FIG. 17 is an implementation flowchart of receiving first indication information by a user equipment according to an embodiment of the present disclosure.

In the embodiment of the present disclosure, the UE receives the first indication information in the second control area. The implementation process of receiving the first indication information by the UE is shown in FIG. 17, and includes the steps described below.

In step 301, the UE determines, according to a type of control information, whether to detect the first indication information.

In step 302, upon the UE determining to detect the first indication information, the UE performs a sequence detection at a convention position in the second control area and acquires the first indication information; or the UE receives the control information carrying the first indication information at the convention position in the second control area.

Method Embodiment Five

Figure 18:
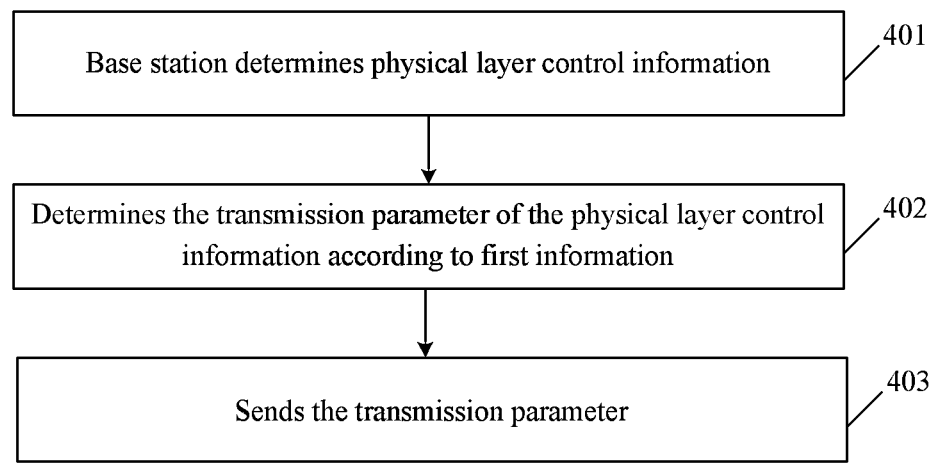
FIG. 18 is a processing flowchart of an information sending method according to embodiment five of the present disclosure.

A processing flowchart of an information sending method is shown in FIG. 18, and the method includes the steps described below.

In step 401, a base station determines physical layer control information.

Specifically, how to determine the physical layer control information by the base station belongs to the existing art, and is not be described herein.

In step 402, according to first information, the transmission parameter of the physical layer control information is further determined.

Here, the first information is used for representing an attribute of the physical layer control information. The first information includes any one or more of a type of control information, a format of the control information, an overhead of the control information, a scrambling method of the control information, and a use of the control information.

The type of the control information includes common control information and dedicated control information. The format of the control information is a DCI format. The overhead of the control information refers to the number of bits of physical layer control signaling. The scrambling method of the control information refers to a RNTI type. The use of the control information refers to a function of the physical layer control signaling, such as paging, power control and system message.

The transmission parameter includes any one or more of: a transmission resource parameter, a transmission technology indication parameter and a demodulation pilot configuration indication parameter.

The transmission resource parameter includes any one or more of: the quantity and positions of control domain transmitting symbols in a transmission time interval (TTI), a time frequency position of the physical control information in the TTI, the number and indexes of transmitting beams, the number and indexes of transmitting sectors, a sending power offset, a sending period and offset (TTI level). The transmission technology indication parameter includes diversity, a single layer, multiple layers, a demodulation pilot configuration indication parameter, the number of ports, density, pattern and a power.

In step 403, the transmission parameter is sent.

The transmission parameter includes: any one or more of a transmission resource parameter, a transmission technology indication parameter and a demodulation pilot configuration indication parameter.

Method Embodiment Six

Figure 19:
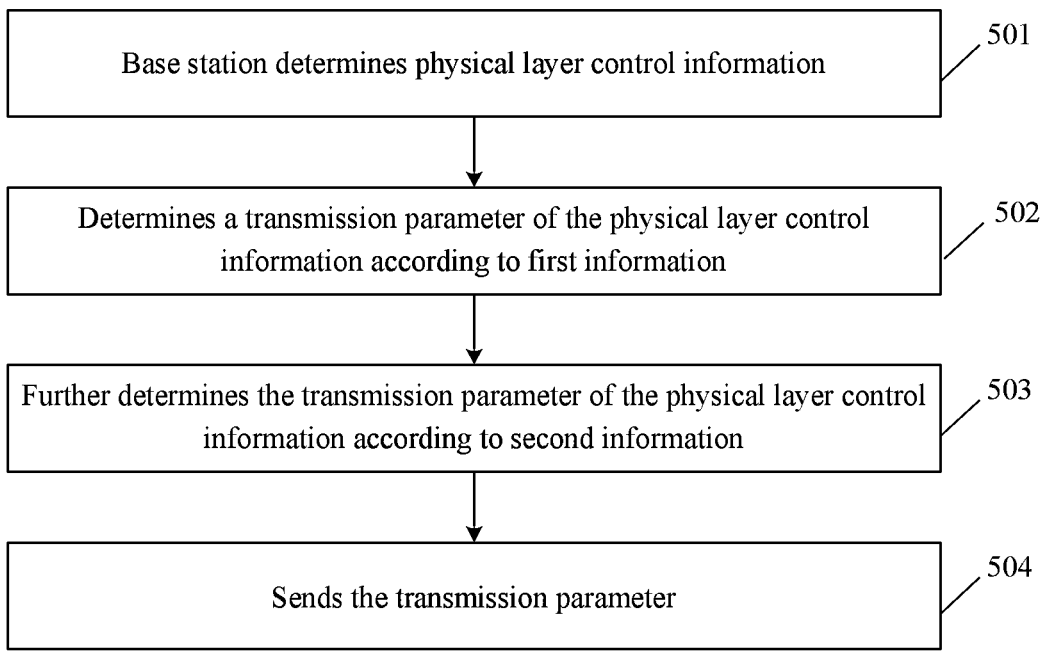
FIG. 19 is a processing flowchart of an information sending method according to embodiment six of the present disclosure.

A processing flowchart of an information sending method is shown in FIG. 19, and the method includes the steps described below.

In step 501, a base station determines physical layer control information.

Specifically, the base station determines the physical layer control information according to parameters such as a signal-to-noise ratio and transmission channel quality.

In step 502, according to first information, the transmission parameter of the physical layer control information is determined.

Here, the first information is used for representing an attribute of the physical layer control information. The first information includes any one or more of: a type of control information, a format of the control information, an overhead of the control information, a scrambling method of the control information, and a use of the control information. The transmission parameter includes any one or more of: a transmission resource parameter, a transmission technology indication parameter, and a demodulation pilot configuration indication parameter.

In step 503, according to second information, the transmission parameter of the physical layer control information is further determined.

Here, the second information includes any one or more of: configuration of a current subframe, a total number of symbols of a downlink area and Numerology configuration.

In step 504, the transmission parameter is sent.

In embodiments five and six of the present disclosure, when the control channel is a common control channel, the number of demodulation reference signal ports is MC, and when the control channel is a dedicated control channel, the number of demodulation reference signal ports is MC1. Here, MC is greater than MC1. The transmission mode of the common control channel is a diversity transmission mode, and the transmission mode of the dedicated control channel is a single layer transmission mode.

In practice applications, a paging message may be sent on a convention sending occasion, or is not sent. Therefore, the terminal needs to perform a blind detection.

According to the embodiments five and six of the present disclosure, different transmission manners of the physical layer control information are designed according to types of the physical layer control information to be sent, improving the transmission efficiency of the system.

Method Embodiment Seven

Figure 20:
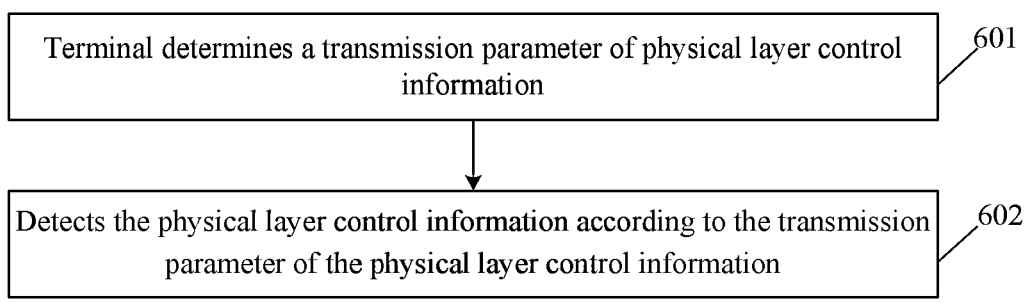
FIG. 20 is a processing flowchart of an information detecting method according to embodiment seven of the present disclosure.

A processing flowchart of an information detecting method is shown in FIG. 20, and the method includes the steps described below.

In step 601, a terminal determines a transmission parameter of physical layer control information.

Specifically, the terminal receives the transmission parameter of the physical layer control information; or determines the transmission parameter of the physical layer control information according to first information. The first information is used for representing an attribute of the physical layer control information.

The transmission parameter includes any one or more of: a transmission resource parameter, a transmission technology indication parameter and a demodulation pilot configuration indication parameter.

The first information includes any one or more of: a type of control information, a format of the control information, an overhead of the control information, a scrambling method of the control information, and a use of the control information.

In step 602, according to the transmission parameter of the physical layer control information, the physical layer control information is detected.

Method Embodiment Eight

Figure 21:
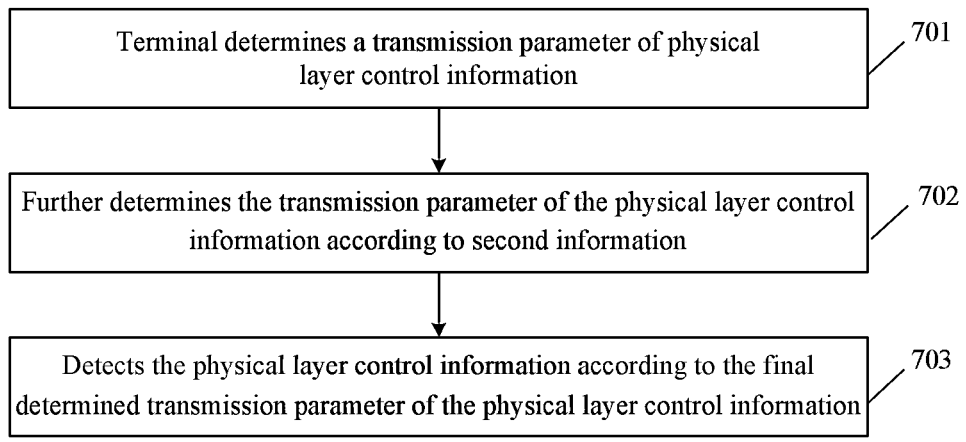
FIG. 21 is a processing flowchart of an information detecting method according to embodiment eight of the present disclosure.

A processing flowchart of an information detecting method is shown in FIG. 21, and the method includes the steps described below.

In step 701, a terminal determines a transmission parameter of physical layer control information.

Specifically, the terminal receives the transmission parameter of the physical layer control information; or determines the transmission parameter of the physical layer control information according to first information, where the first information is used for representing an attribute of the physical layer control information.

The transmission parameter includes any one or more of: a transmission resource parameter, a transmission technology indication parameter and a demodulation pilot configuration indication parameter.

The first information includes any one or more of: a type of control information, a format of the control information, an overhead of the control information, a scrambling method of the control information, and a use of the control information.

In step 702, according to second information, the transmission parameter of the physical layer control information is further determined.

Here, the second information includes any one or more of: configuration of a current subframe, a total number of symbols of a downlink area and Numerology configuration.

In step 703, according to the final determined transmission parameter of the physical layer control information, the physical layer control information is detected.

Method Embodiment Nine

Figure 22:
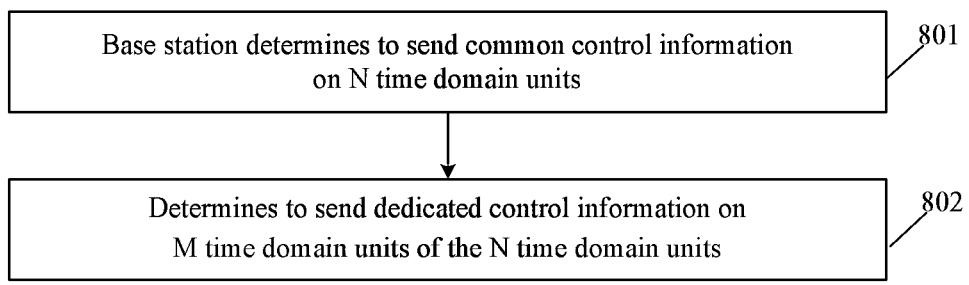
FIG. 22 is a processing flowchart of an information sending method according to embodiment nine of the present disclosure.

A processing flowchart of an information sending method is shown in FIG. 22, and the method includes the steps described below.

In step 801, a base station determines to send common control information on N time domain units.

In step 802, the base station determines to send dedicated control information on M time domain units of the N time domain units.

Herein, N is an integer greater than zero, and M is a subset of N. In the time domain units including both a common control area and a dedicated control area, it is further needed to determine the common control area and the dedicated control area. Herein, one time domain unit includes one or multiple OFDM symbols. The sending position of the dedicated control information is determined according to C-RNTI or radio resource control configuration (RRC)

configuration of the UE, or determined according to CSI feedback from the UE, or is selected from the M time domain units according to the selected sector ID.

Figure 23:
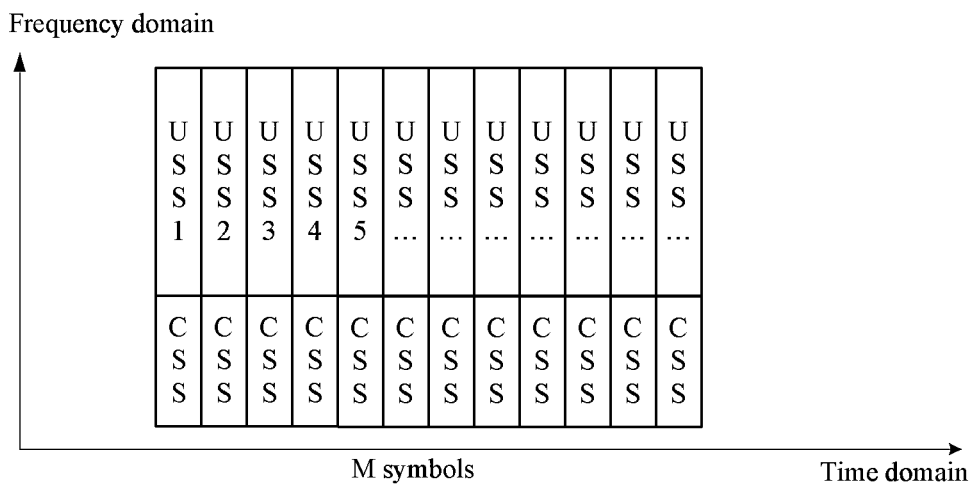
FIG. 23 is a diagram illustrating that a dedicated control channel detection area is a subset of a common control channel time domain resource detection area according to an embodiment of the present disclosure.

In the embodiment of the present disclosure, FIG. 23 shows that a detection area of the dedicated control channel is subset of a time domain resource detection area of the common control channel. The common control information CSS is sent on 12 time domain units. One piece of the common control information is repeatedly transmitted on the 12 time domain units. Different time domain units have different transmitting beams or receiving beams. The common control information on each time domain unit may be decoded independently. For example, one terminal can only receive the signal sent by the transmitting beam of one of the 12 time domain units. Alternatively, the common control information may be jointly decoded. For example, one terminal receives signals sent by the transmitting beams of multiple ones of the 12 time domain units. The time domain units occupied by dedicated control information among the M time domain units is determined according to the RRC configuration or C-RNTI of the UE, or is determined according to the CSI feedback of the UE, or is selected from M symbols according to the selected sector ID. The 12 OFDM symbols each have a corresponding transmitting beam index. In this case, the terminal detects the dedicated control information according to a resident beam appointed with the base station in advance. For example, the terminal and the base station have a convention that the transmitting beam corresponding to the terminal is the transmitting beam 1, and the transmitting beam is on the OFDM symbol 1, the terminal detects the dedicated control information on the OFDM symbol of the 12 OFDM symbols. That is, a detection range in which the terminal detects the dedicated control information is only the OFDM symbol 1. In FIG. 22, on the OFDM symbol where both of the dedicated control information and the common control information exist, both of the dedicated control information and the common control information are in a frequency division manner. The search space of the dedicated control information and the search space of the common control information may be partially overlapping and completely overlapping, and may be distinguished by the scrambling manners of the common control information and the dedicated control information.

Method Embodiment Ten

Figure 24:
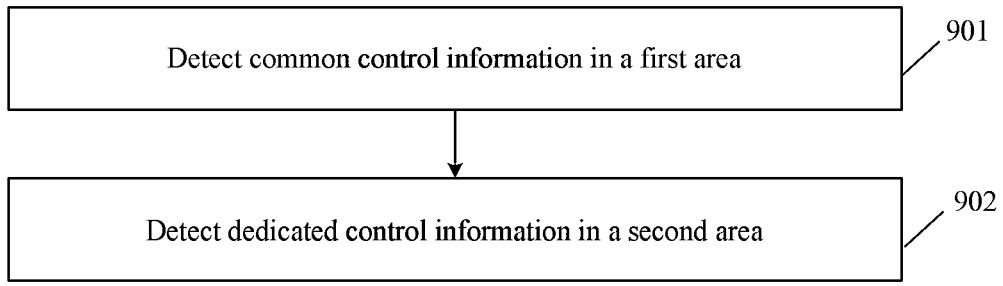
FIG. 24 is a processing flowchart of an information detecting method according to embodiment eleven of the present disclosure.

A processing flowchart of an information detecting method is shown in FIG. 24, and the method includes the steps described below.

In step 901, common control information is detected in a first area.

In step 902, dedicated control information is detected in a second area.

In the embodiment of the present disclosure, in a transmission time interval, the first area includes N time domain units, and the second area includes M time domain units. The M time domain units are a subset of the N time domain units, and M and N are integers greater than zero. The subset is determined according to radio resource control configuration or C-RNTI of the user equipment. Alternatively, the subset is determined according to channel state information feedback from the UE. Alternatively, the subset is determined according to a selected sector identification code. Alternatively, the subset is determined according to a subframe type. Alternatively, the subset is determined according to a value of M.

Device Embodiment One

Figure 25:
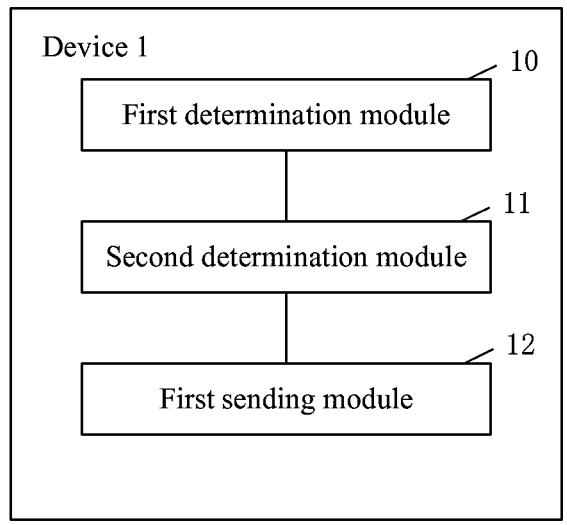
FIG. 25 is a structural diagram of an information sending device according to embodiment one of the present disclosure.

To implement the information sending method in the above method embodiment one, the embodiment of the present disclosure further provides an information sending device. The structure of the information sending device 1 is shown in FIG. 25. The device includes a first determination module 10, a second determination module 11, and a first sending module 12.

The first determination module 10 is configured to determine a transmission configuration parameter associated with a first control area, and the first control area is used for transmitting a common control message.

The second determination module 11 is configured to determine first indication information according to the transmission configuration parameter. The first indication information is used for indicating configuration of the transmission configuration parameter.

The first sending module 12 is configured to send the first indication information.

In the embodiment of the present disclosure, the first sending module 12 is specifically configured to send the first indication information through a physical downlink broadcast channel or at a preset position of a second control area. A time domain symbol set corresponding to the second control area is a subset of a time domain symbol set corresponding to the first control area.

In the embodiment of the present disclosure, the first sending module 10 includes a determination unit 100 and a sending unit 101.

The determination unit 100 is configured to determine, according to a type of control information, whether to send the first indication information.

The sending unit 101, upon the determination unit determining to send the first indication information, is configured to send a sequence at the preset position of the second control area, where the sequence includes the first indication information; alternatively is configured to send the control information at the preset position of the second control area. The control information carries the first indication information.

In the embodiment of the present disclosure, the first control area is an available transmitting resource pool. Part or all of resources in the first control area may be used for sending a common control message. The base station may flexibly decide to use how many resources. Alternatively, the base station and the terminal may have a convention of using all resources in the area for transmission.

Target users of the common control information may be all users in the coverage of the base station, or may be part of users in the coverage of the base station.

In the embodiment of the present disclosure, the transmission configuration parameter of the first control area includes any one or more of: indication information of a time domain resource or resource pool of the first control area, indication information of a spatial domain resource or resource pool of the first control area, an indication parameter of a frequency domain resource or resource pool of the first control area, sending power configuration indication information of the first control area, pilot configuration indication information of the first control area, and channel structure indication information of the first control area.

The indication information of the time domain resource or resource pool of the first control area includes any one or more of: the number of second time units occupied by the first control area in a first time unit, the number of OFDM symbols in the second time unit, and a sending period or a subframe offset of the first control area; where a time unit includes a preset number of second time units.

The indication information of the spatial domain resource or resource pool of the first control area includes any one or more of: a beam number indication parameter, a beam index indication parameter, a transmission layer number indication parameter and a sending sector indication parameter.

The indication parameter of the frequency domain resource or resource pool of the first control area includes: an indication parameter of an occupied subcarrier group or an indication parameter of an occupied resource block group.

The sending power configuration indication information of the first control area includes any one or more of: a power offset of demodulation pilot/measurement pilot and the control information in the first control area, a power offset of the first control area and the second control area, and a power offset of demodulation pilot/measurement pilot and the control information in the second control area.

The pilot configuration indication information of the first control area at least includes any one of: reference demodulation pilot configuration indication information or measurement pilot configuration indication information of symbols where the first control area is located.

The channel structure indication information of the first control area includes: mapping indication information of each channel or signal on the symbols where the first control area is located. Here, a symbol group where the first control area channel is located is divided into multiple subgroups, and symbols in each subgroup uses a same transmitting beam/sequence.

Device Embodiment Two

Figure 26:
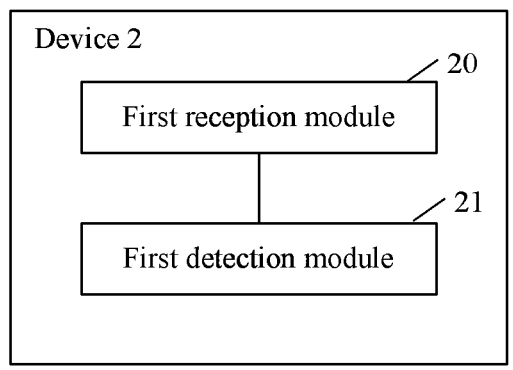
FIG. 26 is a structural diagram of an information detecting device according to embodiment two of the present disclosure.

To implement the information detecting method described in the method embodiment four, an embodiment of the present disclosure provides an information detecting device. The structure of the device 2 is shown in FIG. 26. The device includes: a first reception module 20 and a first detection module 21.

The first reception module 20 is configured to receive first indication information. The first indication information is used for indicating a transmission configuration parameter of a first control area. The first control area is used for transmitting common control information.

The first detection module 21 is configured to detect, according to the first indication information, the common control information.

In the embodiment of the present disclosure, the first reception module 20 is specifically configured to receive the first indication information on a physical downlink broadcast channel or in a second control area.

The first reception module 20 includes a second determination unit 200 and a first reception unit 201.

The second determination unit 200 is configured to determine, according to a type of control information, whether to detect the first indication information.

The first reception unit 201 is configured to, upon the second determination unit determining to detect the first indication information, perform a sequence detection at a convention position in the second control area and acquire the first indication information; or receive the control information carrying the first indication information at a preset position in the second control area.

In the embodiment of the present disclosure, the user equipment detects the common control information according to the transmission configuration parameter of the first control area in the first indication information.

Here, the transmission configuration parameter includes any one or more of: indication information of a time domain resource or resource pool of the first control area, indication information of a spatial domain resource or resource pool of the first control area, an indication parameter of a frequency domain resource or resource pool of the first control area, sending power configuration indication information of the first control area, pilot configuration indication information of the first control area, and channel structure indication information of the first control area.

The indication information of the time domain resource or resource pool of the first control area includes any one or more of: the number of second time units occupied by the first control area in a first time unit, the number of OFDM symbols in the second time unit, and a sending period or a subframe offset of the first control area; where a time unit includes a preset number of second time units.

The indication information of the spatial domain resource or resource pool of the first control area includes any one or more of: a beam number indication parameter, a beam index indication parameter, a transmission layer number indication parameter and a sending sector indication parameter.

The indication parameter of the frequency domain resource or resource pool of the first control area at least includes: any one of an indication parameter of an occupied subcarrier group or an indication parameter of an occupied resource block group.

The sending power configuration indication information of the first control area includes any one or more of: a power offset of demodulation pilot/measurement pilot and the control information in the first control area, a power offset of demodulation pilot/measurement pilot and the control information in the second control area and a power offset of the first control area and the second control area.

The pilot configuration indication information of the first control area at least includes any one of: reference demodulation pilot configuration indication information or measurement pilot configuration indication information of symbols in which the first control area is located.

The channel structure indication information of the first control area includes: mapping indication information of each channel or signal on the symbols in which the first control area is located.

Device Embodiment Three

Figure 27:
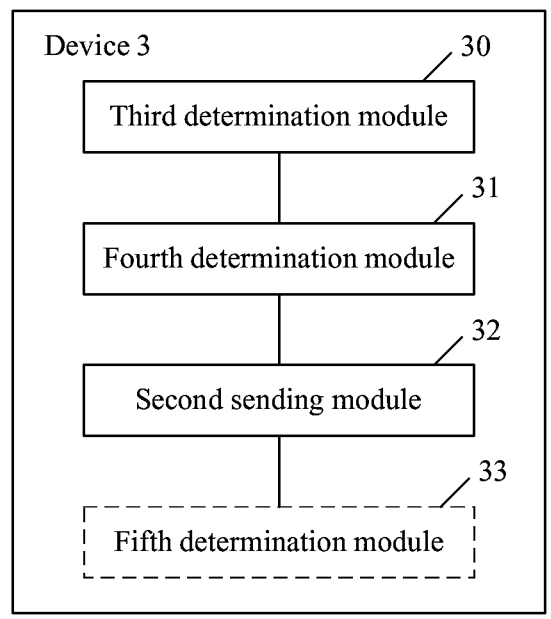
FIG. 27 is a structural diagram of an information sending device according to embodiment three of the present disclosure.

To implement the information sending method described in the method embodiment five, an embodiment of the present disclosure provides an information sending device. The structure of the device 3 is shown in FIG. 27. The device includes: a third determination module 30 and a fourth determination module 31 and a second sending module 32.

The third determination module 30 is configured to determine physical layer control information.

The fourth determination module 31 is configured to determine a transmission parameter of the physical layer control information according to first information, and the first information is used for representing an attribute of the physical layer control information.

The second sending module 32 is configured to send the transmission parameter.

In the embodiment of the present disclosure, the device further includes: a fifth determination module 33, which is configured to determine the transmission parameter of the physical layer control information according to second information.

The second information includes any one or more of: configuration of a current subframe, the total number of symbols of a downlink area and Numerology configuration.

In the embodiment of the present disclosure, the first information includes any one or more of: a type of control information, a format of the control information, an overhead of the control information, a scrambling method of the control information, and a use of the control information.

The type of the control information includes common control and dedicated control. The format of the control information is a DCI format. The overhead of the control information is the number of bits of physical layer control signaling. The scrambling method of the control information is a RNTI type. The use of the control information is the function of the physical layer control signaling, such as paging, power control and system message.

The transmission parameter includes any one or more of: a transmission resource parameter, a transmission technology indication parameter and a demodulation pilot configuration indication parameter.

The transmission resource parameter includes any one or more of: the number and positions of control domain sending symbols in a transmission time interval (TTI), a time frequency position in which the physical control information is located in the TTI, the number and indexes of transmitting beams, the number and indexes of transmitting sectors, a sending power offset, a sending period and offset (TTI level). The transmission technology indication parameter includes: a diversity transmission, a single layer transmission, a multi-layer transmission, a demodulation pilot configuration indication parameter, the number of ports, a density, a pattern, and a power.

Device Embodiment Four

Figure 28:
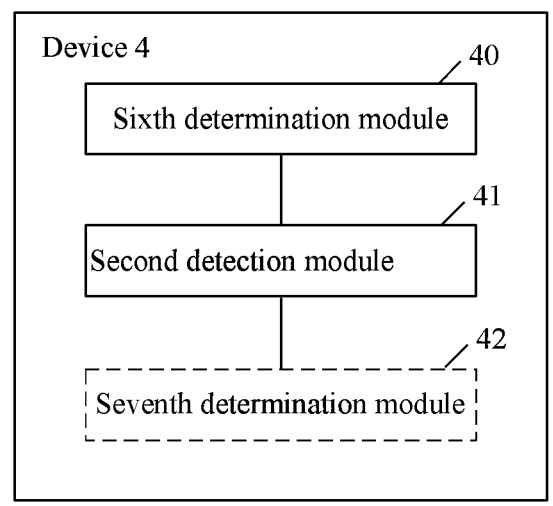
FIG. 28 is a structural diagram of an information detecting device according to embodiment four of the present disclosure.

To implement the information detecting method described in the method embodiment seven, an embodiment of the present disclosure provides an information detecting device. The structure of the device 4 is shown in FIG. 28. The device includes: a sixth determination module 40 and a second detection module 41.

The sixth determination module 40 is configured to determine a transmission parameter of physical layer control information.

The second detection module 41 is configured to detect the physical layer control information according to the transmission parameter of the physical layer control information.

In the embodiment of the present disclosure, the sixth determination module 40 is specifically configured to receive the transmission parameter of the physical layer control information; or determine the transmission parameter of the physical layer control information according to first information, where the first information is used for representing an attribute of the physical layer control information.

In the embodiment of the present disclosure, the information detection device further includes: a seventh determination module 42, which is configured to determine the transmission parameter of the physical layer control information according to second information.

The second information includes any one or more of: configuration of a current subframe, a total number of symbols of a downlink area and Numerology configuration.

Device Embodiment Five

Figure 29:
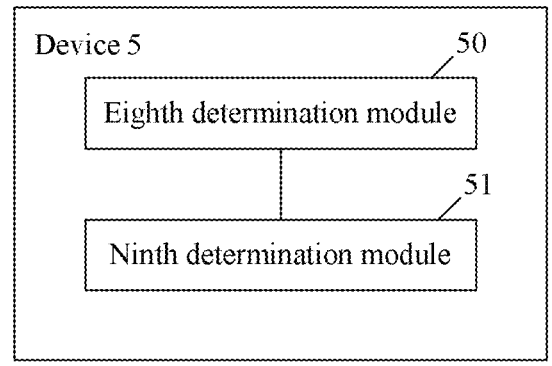
FIG. 29 is a structural diagram of an information sending device according to embodiment five of the present disclosure.

To implement the information sending method described in the method embodiment nine, an embodiment of the present disclosure provides an information sending device. The structure of the device 5 is shown in FIG. 29. The device includes: an eighth determination module 50 and a ninth determination module 51.

The eighth determination module 50 is configured to determine to send common control information on N time domain units.

The ninth determination module 51 is configured to determine to send dedicated control information on M time domain units of the N time domain units. N is an integer greater than zero, and M is a subset of N.

In the embodiment of the present disclosure, the ninth determination module is specifically configured to send the dedicated control information on the M time domain units of the N time domain units according to radio resource control configuration or C-RNTI of the user equipment, or determine, according to channel state information feedback of the user equipment, to send the dedicated control information on the M time domain units of the N time domain units; or send, according to a selected sector identification code, the dedicated control information on the M time domain units.

Device embodiment six

Figure 30:
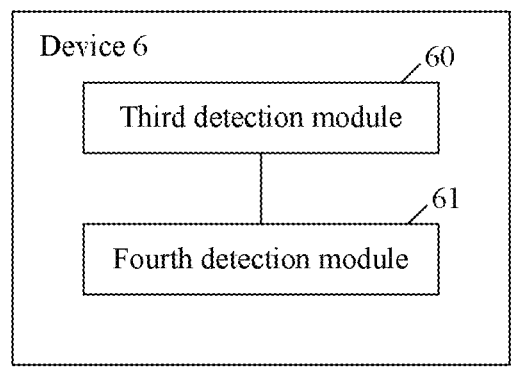
FIG. 30 is a structural diagram of an information detecting device according to embodiment six of the present disclosure.

To implement the information detecting method described in the method embodiment ten, an embodiment of the present disclosure provides an information detecting device. The structure of the device 6 is shown in FIG. 30. The device includes: a third determination module 60 and a fourth detection module 61.

The third detection module 60 is configured to detect common control information in a first area.

The fourth detection module 61 is configured to detect dedicated control information in a second area.

In a transmission time interval, the first area includes N time domain units, and the second area includes M time domain units. The M time domain units are a subset of the N time domain units, and M and N are integers greater than zero. The subset is determined according to radio resource control configuration or C-RNTI of the user equipment; or the subset is determined according to channel state information feedback of the user equipment; or the subset is determined according to a selected sector identification code; or the subset is determined according to a subframe type; or the subset is determined according to a value of M.

Device Embodiment Seven

Figure 31:
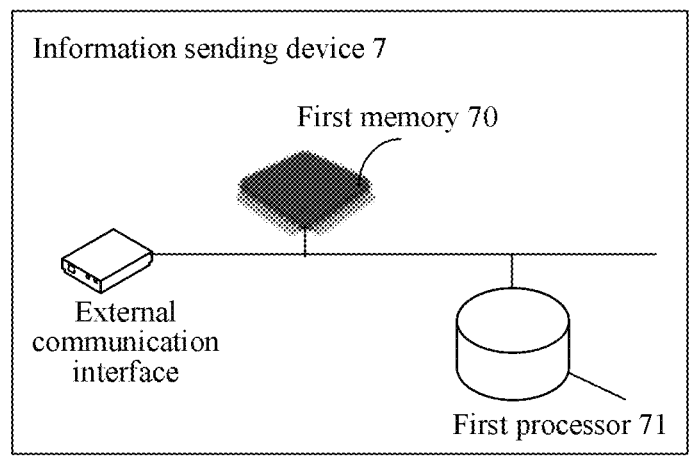
FIG. 31 is a schematic diagram of hardware configuration of an information sending device according to embodiment seven of the present disclosure.

The embodiment seven of the present disclosure further provides an information sending device 7. The structure of the device 7 is shown in FIG. 31. The device includes: a first processor 70 and a first memory 71 storing processor-executable instructions. When the instructions are executed by the processor, the following operations are executed.

determining a transmission configuration parameter associated with a first control area, where the first control area is used for transmitting a common control message; determining first indication information according to the transmission configuration parameter, where the first indication information is used for indicating configuration of the transmission configuration parameter; and sending the first indication information through a physical downlink broadcast channel or at a preset position of a second control area; where a time domain symbol set corresponding to the second control area is a subset of a time domain symbol set corresponding to the first control area.

In the embodiment of the present disclosure, the first processor 70 is specifically configured to: determine whether to send the first indication information. In response to determining to send the first indication information, the first processor is configured to send a sequence at the preset position of the second control area, where the sequence includes the first indication information; or send the control information at the preset position of the second control area, where the control information carries the first indication information.

In the embodiment of the present disclosure, the transmission configuration parameter includes any one or more of: indication information of a time domain resource or resource pool of the first control area, indication information of a spatial domain resource or resource pool of the first control area, an indication parameter of a frequency domain resource or resource pool of the first control area, sending power configuration indication information of the first control area, pilot configuration indication information of the first control area, and channel structure indication information of the first control area.

The indication information of the time domain resource or resource pool of the first control area includes any one or more of: the number of second time units occupied by the first control area in a first time unit, the number of OFDM symbols in the second time unit, and a sending period or a subframe offset of the first control area. A time unit includes a preset number of second time units.

The indication information of the spatial domain resource or resource pool of the first control area includes any one or more of: a beam number indication parameter, a beam index indication parameter, a transmission layer number indication parameter and a sending sector indication parameter.

The indication parameter of the frequency domain resource or resource pool of the first control area at least includes any one of: an indication parameter of an occupied subcarrier group or an indication parameter of an occupied resource block group.

The sending power configuration indication information of the first control area includes any one or more of: a power offset of demodulation pilot/measurement pilot and the control information in the first control area, a power offset of demodulation pilot/measurement pilot and the control information in the second control area, and a power offset of the first control area and the second control area.

The pilot configuration indication information of the first control area at least includes any one of: reference demodulation pilot configuration indication information or measurement pilot configuration indication information of symbols in which the first control area is located.

The channel structure indication information of the first control area includes: mapping indication information of each channel or signal on the symbols in which the first control area is located.

Device Embodiment Eight

Figure 32:
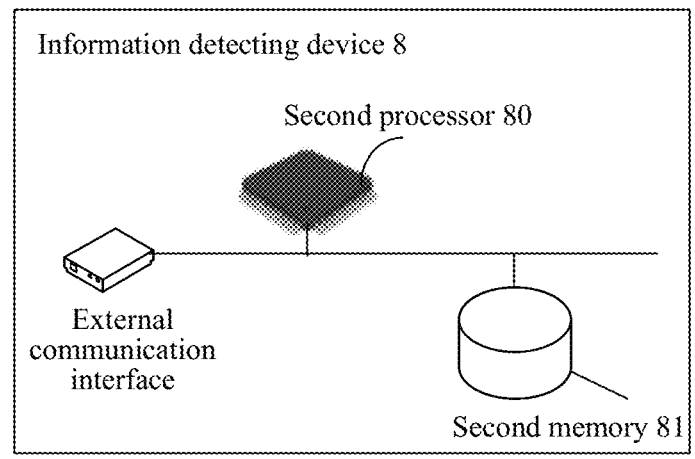
FIG. 32 is a schematic diagram of hardware configuration of an information detecting device according to embodiment eight of the present disclosure.

The embodiment eight of the present disclosure further provides an information detecting device 8. The structure of the device 8 is shown in FIG. 32. The device includes: a second processor 80 and a second memory 81 storing processor-executable instructions. When the instructions are executed by the processor, the following operations are executed.

receiving first indication information for indicating a transmission configuration parameter of a first control area for transmitting common control information; and detecting the common control information according to the first indication information.

In the embodiment of the present disclosure, the second processor 80 is specifically configured to receive the first indication information on a physical downlink broadcast channel or in a second control area.

In the embodiment of the present disclosure, the second processor 80 is specifically configured to determine, according to a type of control information, whether to detect the first indication information. In response to determining to detect the first indication information, the second processor is configured to perform a sequence detection at a preset position of the second control area and acquire the first indication information; or receive control information carrying the first indication information at the preset position of the second control area.

In the embodiment of the present disclosure, the transmission configuration parameter includes any one or more of: indication information of a time domain resource or resource pool of the first control area, indication information of a spatial domain resource or resource pool of the first control area, an indication parameter of a frequency domain resource or resource pool of the first control area, sending power configuration indication information of the first control area, pilot configuration indication information of the first control area, and channel structure indication information of the first control area.

The indication information of the time domain resource or resource pool of the first control area includes any one or more of: the number of second time units occupied by the first control area in a first time unit, the number of OFDM symbols in the second time unit, and a sending period or a subframe offset of the first control area. A time unit includes a preset number of second time units.

The indication information of the spatial domain resource or resource pool of the first control area includes any one or more of: a beam number indication parameter, a beam index indication parameter, a transmission layer number indication parameter and a sending sector indication parameter.

The indication parameter of the frequency domain resource or the resource pool of the first control area at least includes any one of an indication parameter of an occupied subcarrier group or an indication parameter of an occupied resource block group.

The sending power configuration indication information of the first control area includes any one or more of: a power offset of demodulation pilot/measurement pilot and the control information in the first control area, a power offset of demodulation pilot/measurement pilot and the control information in the second control area, and a power offset of the first control area and the second control area.

The pilot configuration indication information of the first control area at least includes any one of reference demodulation pilot configuration indication information or measurement pilot configuration indication information of symbols in which the first control area is located.

The channel structure indication information of the first control area includes: mapping indication information of each channel or signal on the symbols in which the first control area is located.

Device Embodiment Nine

Figure 33:
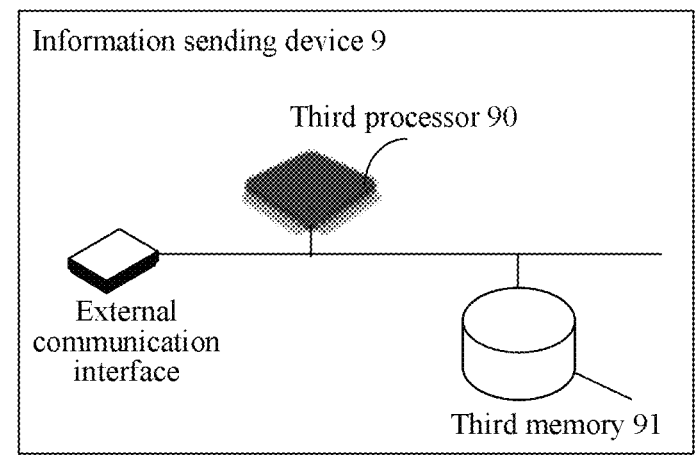
FIG. 33 is a schematic diagram of hardware configuration of an information sending device according to embodiment nine of the present disclosure.

The embodiment nine of the present disclosure further provides an information sending device 9. The structure of the device 9 is shown in FIG. 33. The device includes: a third processor 90 and a third memory 91 storing processor-executable instructions. When the instructions are executed by the processor, the following operations are executed.

determining a transmission parameter of physical layer control information; determining the transmission parameter of the physical layer control information according to first information that is used for representing an attribute of the physical layer control information, and sending the transmission parameter.

In the embodiment of the present disclosure, the third processor 90 is further configured to determine the transmission parameter of the physical layer control information according to second information; where the second information includes any one or more of configuration of a current subframe, a total number of symbols of a downlink area and Numerology configuration.

In the embodiment of the present disclosure, the first information includes any one or more of a type of control information, a format of the control information, an overhead of the control information, a scrambling method of the control information, and a use of the control information.

The transmission parameter includes any one or more of a transmission resource parameter, a transmission technology indication parameter and a demodulation pilot configuration indication parameter.

Device Embodiment Ten

Figure 34:
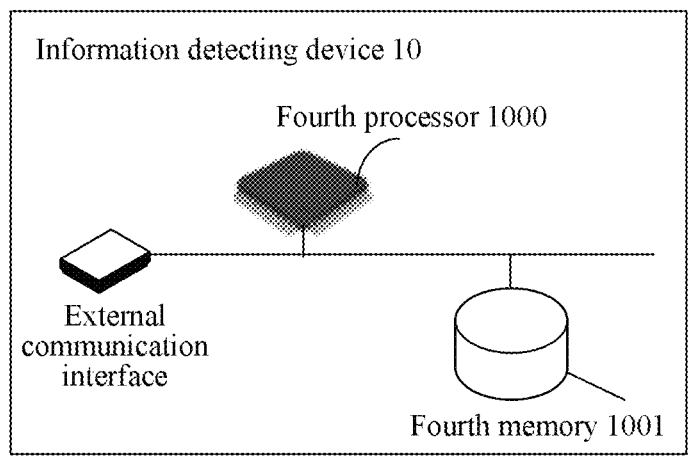
FIG. 34 is a schematic diagram of hardware configuration of an information detecting device according to embodiment ten of the present disclosure.

The embodiment ten of the present disclosure further provides an information detecting device 10. The structure of the device 10 is shown in FIG. 34. The device includes: a fourth processor 1000 and a fourth memory 1001 storing instructions executable by the fourth processor 1000. When the instructions are executed by the processor, the following operations are executed.

determining a transmission parameter of the physical layer control information; and detecting the physical layer control information according to the transmission parameter of the physical layer control information.

In the embodiment of the present disclosure, the fourth processor 1000 is specifically configured to receive the transmission parameter of the physical layer control information; or determine the transmission parameter of the physical layer control information according to first information, where the first information is used for representing an attribute of the physical layer control information.

In the embodiment of the present disclosure, the fourth processor 1000 is further configured to determine the transmission parameter of the physical layer control information according to second information; where the second information includes any one or more of L configuration of a current subframe, a total number of symbols of a downlink area and Numerology configuration.

In the embodiment of the present disclosure, the first information includes any one or more of a type of control information, a format of the control information, an overhead of the control information, a scrambling method of the control information, and a use of the control information.

The transmission parameter includes any one or more of a transmission resource parameter, a transmission technology indication parameter and a demodulation pilot configuration indication parameter.

Device Embodiment Eleven

Figure 35:
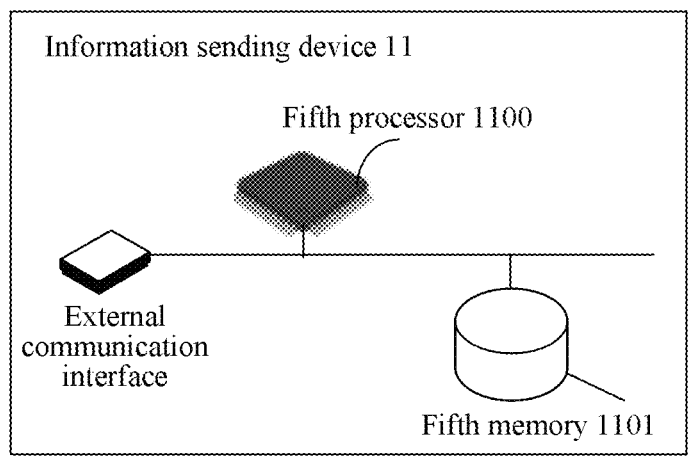
FIG. 35 is a schematic diagram of hardware configuration of an information sending device according to embodiment eleven of the present disclosure.

The embodiment eleven of the present disclosure further provides an information sending device 11. The structure of the device 11 is shown in FIG. 35. The device includes: a fifth processor 1100 and a fifth memory 1101 storing instructions executable by the fifth processor 1100. When the instructions are executed by the processor, the following operations are executed.

determining to send common control information on N time domain units; and determining to send dedicated control information on M time domain units of the N time domain units; where N is an integer greater than zero, and M is a subset of N.

In the embodiment of the present disclosure, the fifth processor 1100 is specifically configured to send the dedicated control information on the M time domain units of the N time domain units according to radio resource control configuration or C-RNTI of a user equipment, or determine, according to channel state information feedback of the user equipment, to send the dedicated control information on the M time domain units of the N time domain units; or send, according to a selected sector identification code, the dedicated control information on the M time domain units.

Device Embodiment Twelve

Figure 36:
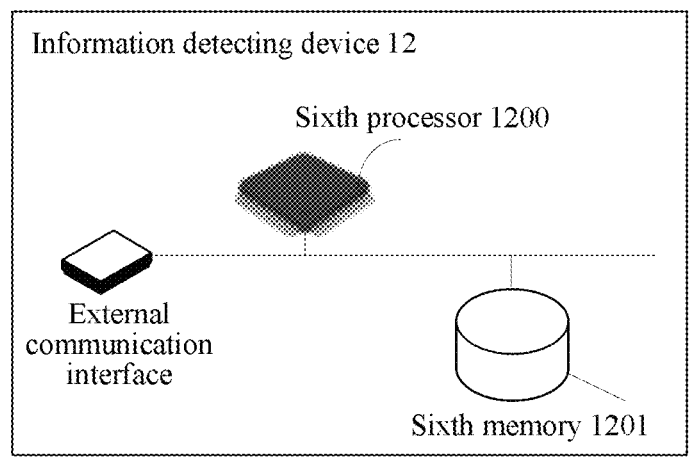
FIG. 36 is a schematic diagram of hardware configuration of an information detecting device according to embodiment twelve of the present disclosure.

The embodiment twelve of the present disclosure further provides an information detecting device 12. The structure of the device 12 is shown in FIG. 36. The device includes: a sixth processor 1200 and a sixth memory 1201 storing processor-executable instructions. When the instructions are executed by the processor, the following operations are executed.

detecting common control information in a first area; and detecting dedicated control information in a second area.

In a transmission time interval, the first area includes N time domain units, and the second area includes M time domain units. The M time domain units are a subset of the N time domain units, and M and N are integers greater than zero.

In the embodiment of the present disclosure, the subset is determined according to radio resource control configuration or C-RNTI of the user equipment; or the subset is determined according to channel state information feedback of the user equipment; or the subset is determined according to a selected sector identification code; or the subset is determined according to a subframe type; or the subset is determined according to a value of M.

An embodiment of the present disclosure further provides a computer-readable storage medium configured to store computer-executable instructions. When the instructions are executed by a processor, the above information sending methods applied to a base station are implemented.

An embodiment of the present disclosure further provides a computer-readable storage medium configured to store computer-executable instructions. When the instructions are executed by a processor, the above information detecting methods applied to the user equipment are implemented.

It is to be noted that in practical applications, functions of the first determination module 10, the second determination module 11 and the first sending module 12, the third determination module 30, the fourth determination module 31 and the second sending module 32, the fifth determination module 33, the eighth determination module 50 and the ninth determination module 51 may be implemented by a central processing unit (CPU), or a micro processor unit (MPU), or a digital signal processor (DSP), or a field programmable gate array (FPGA) or the like in the base station.

Functions of the first reception module 20, the first detection module 21, the sixth determination module 40, the second detection module 41, the seventh determination module 42, the third detection module 60 and the fourth detection module 61 may be implemented by the CPU, or the MPU, or the DSP or the FPGA in the user equipment.

The above are only preferred embodiments of the present disclosure and are not intended to limit the scope of the present disclosure.

INDUSTRIAL APPLICABILITY

Technical solutions provided by the embodiments of the present disclosure may applied to the information processing process. The base station determines a transmission configuration parameter associated with a first control region, where the first control region is used for transmitting a common control message; and determines first indication information according to the transmission configuration parameter, where the first indication information is used for indicating configuration of the transmission configuration parameter; and sends the first indication information. The user equipment receives first indication information used for indicating the transmission configuration parameter of the first control area used for transmitting common control information; parsing the first indication information and acquiring the transmission configuration parameter of the first control area, and detecting the common control information according to the transmission configuration parameter of the first control area. Therefore, the base station can flexibly adjust the transmitting resource of the common control information according to the determined transmission configuration parameter, and the base station sends the first indication information for indicating the configuration of the transmission configuration parameter through the physical downlink broadcast channel, thereby effectively improving the transmission efficiency and utilization of the resources.

What is claimed is:

1. An information sending method, comprising:
determining a transmission configuration parameter associated with a first control area, wherein the first control area is used for transmitting a common control message; and determining first indication information according to the transmission configuration parameter, wherein the first indication information is used for indicating a configuration of the transmission configuration parameter which comprises any one or more of: indication information of a time domain resource or time domain resource pool of the first control area, indication information of a spatial domain resource or spatial domain resource pool of the first control area, an indication parameter of a frequency domain resource or frequency domain resource pool of the first control area, sending power configuration indication information of the first control area, pilot configuration indication information of the first control area, and channel structure indication information of the first control area; and
sending the first indication information at a preset position of a second control area;
wherein a time domain symbol set corresponding to the second control area is a subset of a time domain symbol set corresponding to the first control area.

2. The information sending method of claim 1, wherein the sending the first indication information at the preset position of the second control area comprises:
determining, according to a type of control information, whether to send the first indication information; and
in response to determining to send the first indication information, sending a sequence at the preset position of the second control area, wherein the sequence comprises the first indication information; or sending the control information at the preset position of the second control area, wherein the control information carries the first indication information.

3. The information sending method of claim 1, wherein the indication information of the time domain resource or time domain resource pool of the first control area comprises any one or more of:
a number of second time units occupied by the first control area in a first time unit, a number of orthogonal frequency division multiplexing (OFDM) symbols in the second time unit, and a sending period or a subframe offset of the first control area;
wherein the time unit comprises a preset number of the second time units.

4. The information sending method of claim 1, wherein the indication information of the spatial domain resource or spatial domain resource pool of the first control area comprises any one or more of:
a beam number indication parameter, a beam index indication parameter, a transmission layer number indication parameter, and a sending sector indication parameter.

5. The information sending method of claim 1, wherein the indication parameter of the frequency domain resource or frequency domain resource pool of the first control area at least comprises any one of:
an indication parameter of an occupied subcarrier group or an indication parameter of an occupied resource block group.

6. The information sending method of claim 1, wherein the sending power configuration indication information of the first control area comprises any one or more of:
a power offset of demodulation pilot/measurement pilot and the control information in the first control area, a power offset of demodulation pilot/measurement pilot and the control information in the second control area, and a power offset of the first control area and the second control area.

7. The information sending method of claim 1, wherein the pilot configuration indication information of the first control area at least comprises any one or more of:
reference demodulation pilot configuration indication information or measurement pilot configuration indication information of symbols where the first control area is located.

8. The information sending method of claim 1, wherein the channel structure indication information of the first control area comprises:
mapping indication information of each channel or signal on symbols where the first control area is located.

9. An information detecting method, comprising:
receiving first indication information, wherein the first indication information is used for indicating a transmission configuration parameter of a first control area, the transmission configuration parameter comprises any one or more of: indication information of a time domain resource or time domain resource pool of the first control area, indication information of a spatial domain resource or spatial domain resource pool of the first control area, an indication parameter of a frequency domain resource or frequency domain resource pool of the first control area, sending power configuration indication information of the first control area, pilot configuration indication information of the first control area, and channel structure indication information of the first control area, and the first control area is used for transmitting common control information; and detecting the common control information according to the first indication information.

10. The information detecting method of claim 9, wherein the receiving the first indication information comprises:
receiving the first indication information in a second control area.

11. The information detecting method of claim 10, wherein a time domain symbol set corresponding to the second control area is a subset of a time domain symbol set corresponding to the first control area.

12. The information detecting method of claim 9, wherein receiving, by a user equipment, the first indication information comprises:
determining, by the user equipment, according to a type of control information, whether to detect the first indication information; and
in response to determining to detect the first indication information, performing a sequence detection at an appointed position in the second control area, and acquiring the first indication information; or receiving the control information carrying the first indication information at the preset position in the second control area.

13. The information detecting method of claim 9, wherein the indication information of the time domain resource or resource pool of the first control area comprises any one or more of:
a number of second time units occupied by the first control area in a first time unit, a number of orthogonal frequency division multiplexing (OFDM) symbols in the second time unit, and a sending period or a subframe offset of the first control area;

wherein a time unit comprises a preset number of second time units.

14. The information detecting method of claim 9, wherein the indication information of the spatial domain resource or resource pool of the first control area comprises any one or more of:
a beam number indication parameter, a beam index indication parameter, a transmission layer number indication parameter, and a sending sector indication parameter.

15. An information sending device, comprising:
a processor; and
a memory communicably connected with the processor for storing instructions executable by the processor,
wherein execution of the instructions by the processor causes the processor to:
determining a transmission configuration parameter associated with a first control area, wherein the first control area is used for transmitting a common control message; and determining first indication information according to the transmission configuration parameter, wherein the first indication information is used for indicating a configuration of the transmission configuration parameter which comprises any one or more of: indication information of a time domain resource or time domain resource pool of the first control area, indication information of a spatial domain resource or spatial domain resource pool of the first control area, an indication parameter of a frequency domain resource or frequency domain resource pool of the first control area, sending power configuration indication information of the first control area, pilot configuration indication information of the first control area, and channel structure indication information of the first control area; and
sending the first indication information at a preset position of a second control area;
wherein a time domain symbol set corresponding to the second control area is a subset of a time domain symbol set corresponding to the first control area.

\* \* \* \* \*